US011421612B2

(12) United States Patent
Idogawa et al.

(10) Patent No.: US 11,421,612 B2
(45) Date of Patent: Aug. 23, 2022

(54) ENGINE DEVICE

(71) Applicant: TOYOTA JIDOSHA KABUSHIKI KAISHA, Aichi-ken (JP)

(72) Inventors: Masanao Idogawa, Nagoya (JP); Takahiro Uchida, Okazaki (JP); Masahiro Kachi, Nagakute (JP); Reiko Goh, Toyota (JP); Hirokatsu Yamamoto, Chita (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 0 days.

(21) Appl. No.: 17/233,554

(22) Filed: Apr. 19, 2021

(65) Prior Publication Data
US 2021/0363928 A1   Nov. 25, 2021

(30) Foreign Application Priority Data

May 22, 2020  (JP) .............................. JP2020-090133

(51) Int. Cl.
*F02D 41/30* (2006.01)
*F02D 41/00* (2006.01)
*F02B 37/00* (2006.01)

(52) U.S. Cl.
CPC ............ *F02D 41/004* (2013.01); *F02B 37/00* (2013.01); *F02D 41/30* (2013.01)

(58) Field of Classification Search
CPC .... F02D 41/004; F02D 41/30; F02D 41/0042; F02D 41/0045; F02D 41/1456; F02D 2200/021; F02B 37/00; F02B 37/18; F02B 37/162; F02M 25/089
USPC ................................................... 123/518–520
See application file for complete search history.

(56) References Cited

U.S. PATENT DOCUMENTS

| | | | | |
|---|---|---|---|---|
| 11,215,146 | B2* | 1/2022 | Idogawa | ............... F02D 41/004 |
| 11,230,983 | B2* | 1/2022 | Idogawa | ............... F02D 41/004 |
| 11,248,570 | B2* | 2/2022 | Idogawa | ............. F02D 41/0007 |
| 11,286,896 | B2* | 3/2022 | Geyer | .................. F02M 59/102 |
| 2020/0025156 | A1 | 1/2020 | Mizushima et al. | |

FOREIGN PATENT DOCUMENTS

JP      201952561 A    4/2019

* cited by examiner

*Primary Examiner* — Hai H Huynh
(74) *Attorney, Agent, or Firm* — Hauptman Ham, LLP

(57) ABSTRACT

When first switching of switching from a first purge of supplying evaporated fuel gas to an intake pipe through a first purge passage to a second purge of supplying the evaporated fuel gas to the intake pipe through a second purge passage occurs and then second switching of switching from the second purge to the first purge occurs, a purge concentration-related value is corrected to a value closer to a first stored value that is the purge concentration-related value immediately before the first switching than to a second stored value that is the purge concentration-related value immediately before the second switching.

8 Claims, 12 Drawing Sheets

ENGINE DEVICE

CROSS-REFERENCE TO RELATED APPLICATION

This application claims priority to Japanese Patent Application No. 2020-090133 filed on May 22, 2020, incorporated herein by reference in its entirety.

BACKGROUND

1. Technical Field

The present disclosure relates to an engine device.

2. Description of Related Art

An engine device of the type in question has been hitherto proposed that includes a first purge passage through which evaporated fuel gas containing evaporated fuel is supplied for purging to an intake pipe of an engine, downstream of a throttle valve, and a second purge passage through which the evaporated fuel gas is supplied for purging to the intake pipe, upstream of a compressor of a turbocharger, by an ejector that generates a negative pressure using a supercharging pressure from the turbocharger (e.g., see Japanese Unexamined Patent Application Publication No. 2019-052561). In this engine device, an intake pipe pressure that is a pressure inside the intake pipe, downstream of the throttle valve, and a pressure generated by the ejector are compared to detect through which of the first purge passage and the second purge passage the purge is performed. When the purge passage switches between the first purge passage and the second purge passage, control characteristic data used for controlling a purge control valve is switched between first control characteristic data suitable for the first purge passage and second control characteristic data suitable for the second purge passage.

SUMMARY

In an engine device, the air-fuel ratio of the engine tends to be unstable during the second purge in which the purge passage is the second purge passage, compared with during the first purge in which the purge passage is the first purge passage, due to factors including a longer time taken for the evaporated fuel gas to reach a combustion chamber of the engine and fluctuations of the supercharging pressure, both attributable to the longer path to the combustion chamber. Therefore, when a purge concentration-related value related to the concentration of the evaporated fuel gas is learned (updated) based on a deviation of the air-fuel ratio from a required air-fuel ratio, the accuracy of the purge concentration-related value (learned value) tends to be low (a deviation of the learned value from a theoretical value that is theoretically expected tends to be large) during the second purge. This makes it necessary to correct the purge concentration-related value (learned value) to a more appropriate value after the second purge has switched to the first purge.

A main object of an engine device of the present disclosure is to correct the purge concentration-related value (learned value) to a more appropriate value after the second purge has switched to the first purge.

The engine device of the present disclosure has adopted the following solutions to achieve this main object.

The gist of the engine device of the present disclosure is as follows:

An engine device including:
an engine that has a throttle valve disposed in an intake pipe and a fuel injection valve and outputs power using fuel supplied from a fuel tank;
a turbocharger having a compressor disposed in the intake pipe, upstream of the throttle valve;
an evaporated fuel processing device having
a supply passage that splits into a first purge passage and a second purge passage that are connected to the intake pipe, downstream of the throttle valve, and supplies evaporated fuel gas containing evaporated fuel generated inside the fuel tank to the intake pipe,
an ejector having an intake port connected to a recirculation passage extending from the intake pipe, between the compressor and the throttle valve, an exhaust port connected to the intake pipe, upstream of the compressor, and a suction port connected to the second purge passage, and
a purge control valve provided in the supply passage;
an air-fuel ratio sensor mounted on an exhaust pipe of the engine; and
a controller that controls the fuel injection valve by setting a required injection amount using a required load factor of the engine and a purge correction amount that is based on a purge concentration-related value related to the concentration of the evaporated fuel gas, controls the purge control valve using a driving duty based on a required purge ratio while a purge of supplying the evaporated fuel gas to the intake pipe is executed, and learns, during execution of the purge, the purge concentration-related value based on an air-fuel ratio deviation that is a deviation of an air-fuel ratio detected by the air-fuel ratio sensor from a required air-fuel ratio, wherein when first switching that is switching from a first purge of supplying the evaporated fuel gas to the intake pipe through the first purge passage to a second purge of supplying the evaporated fuel gas to the intake pipe through the second purge passage occurs and then second switching that is switching from the second purge to the first purge occurs, the controller corrects the purge concentration-related value to a value closer to a first stored value that is the purge concentration-related value immediately before the first switching than to a second stored value that is the purge concentration-related value immediately before the second switching.

In the engine device of the present disclosure, the fuel injection valve is controlled by setting the required injection amount using the required load factor of the engine and the purge correction amount that is based on the purge concentration-related value related to the concentration of the evaporated fuel gas. The purge control valve is controlled using a driving duty based on the required purge ratio while a purge of supplying the evaporated fuel gas to the intake pipe is executed. During execution of the purge, the purge concentration-related value is learned based on the air-fuel ratio deviation that is a deviation of the air-fuel ratio detected by the air-fuel ratio sensor from the required air-fuel ratio. When the first switching that is switching from the first purge of supplying the evaporated fuel gas to the intake pipe through the first purge passage to the second purge of supplying the evaporated fuel gas to the intake pipe through the second purge passage occurs and then the second switching that is switching from the second purge to the first purge occurs, the controller corrects the purge concentration-related value to a value closer to the first stored value that is the purge concentration-related value immediately before the first switching than to the second stored value that is the purge concentration-related value immediately before the second switching. The present inventors confirmed by experiment and analysis that during the second purge, the purge concentration-related value (learned value) tended to undergo a great degree of change (as the absolute value) compared with a theoretical degree of change that is theoretically expected. Therefore, correcting the purge concentration-related value (learned value) to a value closer to the first stored value than to the second stored value at the time of occurrence of the second switching can promptly correct the purge concentration-related value to a more appropriate value.

In the engine device of the present disclosure, the controller may correct the purge concentration-related value to a value closer to the first stored value when a difference between the second stored value and the first stored value at the time of occurrence of the second switching is large than when the difference is small. The present inventors confirmed by experiment and analysis that when the purge concentration-related value (learned value) underwent a greater degree of change (as the absolute value) during the second purge, the purge concentration-related value tended to undergo a greater degree of change compared with the theoretical degree of change. Therefore, correcting the purge concentration-related value to a value closer to the first stored value when the difference between the second stored value and the first stored value at the time of occurrence of the second switching is large than when the difference is small can promptly correct the purge concentration-related value to a value that is more sufficiently appropriate.

In the engine device of the present disclosure, the controller may correct the purge concentration-related value within a range closer to the second stored value when, at the time of occurrence of the second switching, a counter related to a time during which an intake air temperature of the engine is equal to or higher than a predetermined temperature and the purge is not executed has a large value than when the counter has a small value. This is because when the time during which the purge is not executed in a high-temperature environment is long, the influence that a deviation of the purge concentration-related value (learned value) from a theoretical value in learning of the purge concentration-related value during the second purge has on the second stored value is expected to be small compared with the influence that a deviation of the purge concentration-related value (learned value) from the theoretical value due to evaporated fuel generated inside the fuel tank (the influence of a purge not being executed) has on the second stored value.

In this case, when a first condition that the intake air temperature is equal to or higher than the predetermined temperature and moreover the purge is not being executed is met, the controller may increase the value of the counter. When a second condition that the intake air temperature is lower than the predetermined temperature and moreover the purge is being executed, or a third condition that the intake air temperature is equal to or higher than the predetermined temperature and moreover, of the purges, the second purge is being executed is met, the controller may retain the value of the counter. When none of the first condition, the second condition, and the third condition is met, the controller may decrease or reset the value of the counter. Thus, the counter can be more appropriately set.

In the engine device of the present disclosure, when the second switching occurs, the controller may correct the purge concentration-related value as a sum of the first stored value and a value that is obtained by subtracting the first stored value from the second stored value and then multiplying the resulting value by a factor that is smaller than one.

In the engine device of the present disclosure, when, at the time of occurrence of the second switching, there is no permission history that high-duty control of making the driving duty higher than a predetermined duty was permitted during the first purge before the second switching, the controller may prohibit the high-duty control and set the second stored value as the purge concentration-related value. This is because when the high-duty control is prohibited at the time of occurrence of the second switching, the purge concentration-related value is less likely to change significantly immediately thereafter.

In the engine device of the present disclosure, the controller may set the required injection amount using the required load factor, an air-fuel ratio correction amount related to a deviation of the air-fuel ratio sensor, and the purge correction amount, and when a predetermined condition is met, further set the air-fuel ratio correction amount for an applicable region to which a current intake air amount or load factor of the engine belongs among a plurality of regions into which a range of the intake air amount or the load factor is divided such that a region of a larger intake air amount or a higher load factor has a larger width than a region of a smaller intake air amount or a lower load factor.

In the engine device of the present disclosure, the controller may determine a dominant purge that is dominant one of the first purge and the second purge, based on an ejector pressure that is a pressure at the suction port of the ejector and on a value of a post-throttle-valve pressure that is a pressure inside the intake pipe, downstream of the throttle valve, with an offset amount based on the cross-sectional area of the second purge passage relative to the cross-sectional area of the first purge passage taken into account. Thus, the dominant purge can be more appropriately determined compared with when the offset amount based on the cross-sectional area of the second purge passage relative to the cross-sectional area of the first purge passage is not taken into account. The "cross-sectional area" may be represented by a pipe diameter.

In this case, the controller may set the offset amount such that the absolute value of the offset amount as a negative value becomes larger as the absolute value of the post-throttle-valve pressure as a negative value becomes larger. This is because when the absolute value of the post-throttle-valve pressure as a negative value is larger, the influence of the cross-sectional area of the second purge passage relative to the cross-sectional area of the first purge passage is greater.

Further, in this case, the controller may estimate the ejector pressure based on a pressure difference between a supercharging pressure that is a pressure inside the intake pipe, between the compressor and the throttle valve, and a pre-compressor pressure that is a pressure inside the intake pipe, upstream of the compressor, and on the driving duty. Thus, the ejector pressure can be estimated.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Next, a mode for carrying out the present disclosure will be described using an embodiment.

Figure 1:
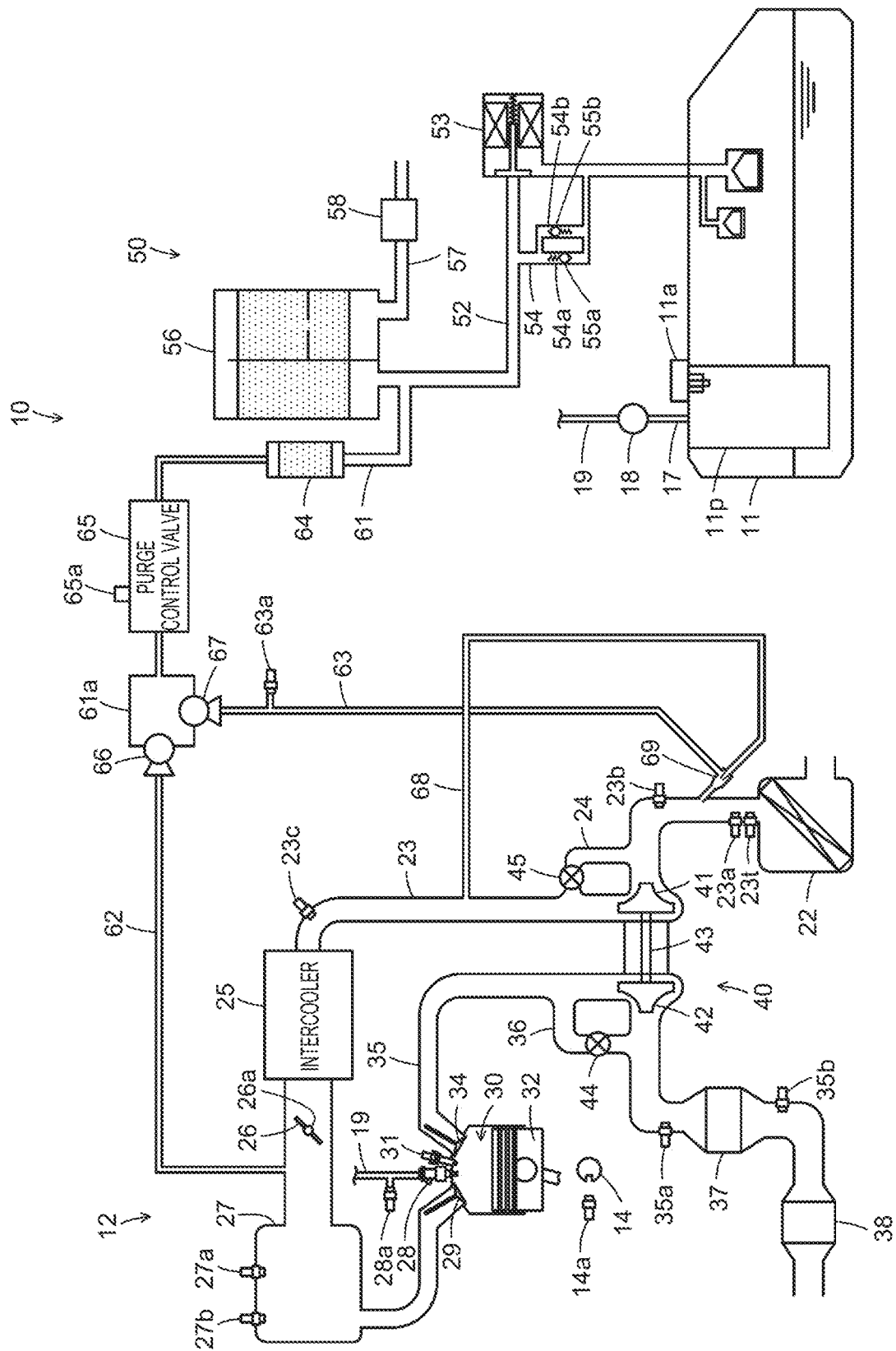
FIG. 1 is a configuration diagram showing an overview of the configuration of an engine device 10.
Figure 2:
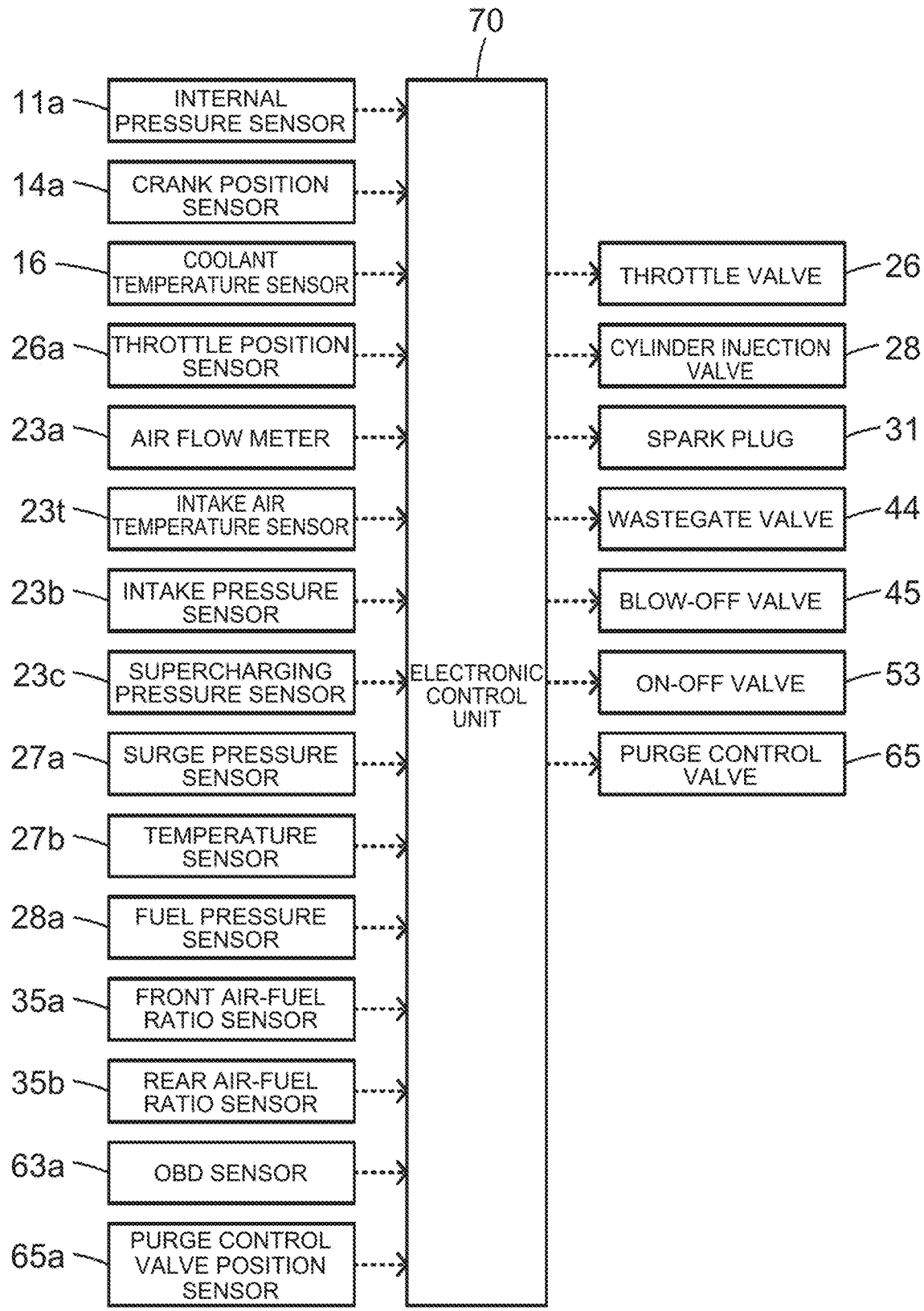
FIG. 2 is a chart illustrating examples of input and output signals of an electronic control unit 70.

FIG. 1 is a configuration diagram showing an overview of the configuration of an engine device 10 as one embodiment of the present disclosure, and FIG. 2 is a chart illustrating examples of input and output signals of an electronic control unit 70. The engine device 10 of the embodiment is installed in ordinary vehicles that travel using power from an engine 12, or various types of hybrid vehicles that are equipped with a motor in addition to the engine 12. As shown in FIG. 1 and FIG. 2, the engine device 10 includes the engine 12, a turbocharger 40, an evaporated fuel processing device 50, and the electronic control unit 70.

The engine 12 is configured as an internal combustion engine that outputs power using fuel, such as gasoline or light oil, supplied from a fuel tank 11. In the engine 12, air cleaned by an air cleaner 22 is taken into an intake pipe 23 and passed through an intercooler 25, a throttle valve 26, and a surge tank 27 in this order. Then, fuel is injected from a cylinder injection valve 28 mounted on a combustion chamber 30 to the air taken into the combustion chamber 30 through an intake valve 29. The air and the fuel thus mixed together undergo explosive combustion caused by an electric spark from a spark plug 31. The engine 12 converts reciprocating motion of a piston 32 that is pushed down by the energy of this explosive combustion into rotating motion of a crankshaft 14. Exhaust gas discharged from the combustion chamber 30 to an exhaust pipe 35 through an exhaust valve 34 is discharged into outside air through exhaust gas control apparatuses 37, 38 having a catalyst (three-way catalyst) that removes harmful components, such as carbon monoxide (CO), hydrocarbon (HC), and nitrogen oxides (NOx). The fuel is supplied from the fuel tank 11 to the cylinder injection valve 28 through a feed pump 11p, a low-pressure-side fuel passage 17, a high-pressure pump 18, and a high-pressure-side fuel passage 19. The high-pressure pump 18 is driven by power from the engine 12 to pressurize the fuel in the low-pressure-side fuel passage 17 and supply the pressurized fuel to the high-pressure-side fuel passage 19.

The turbocharger 40 is configured as a turbocharger including a compressor 41, a turbine 42, a rotating shaft 43, a wastegate valve 44, and a blow-off valve 45. The compressor 41 is disposed in the intake pipe 23, upstream of the intercooler 25. The turbine 42 is disposed in the exhaust pipe 35, upstream of the exhaust gas control apparatus 37. The rotating shaft 43 couples the compressor 41 and the turbine 42 to each other. The wastegate valve 44 is provided in a bypass pipe 36 that couples two points in the exhaust pipe 35, one upstream and the other downstream of the turbine 42, to each other, and is controlled by the electronic control unit 70. The blow-off valve 45 is provided in a bypass pipe 24 that couples two points in the intake pipe 23, one upstream and the other downstream of the compressor 41, to each other, and is controlled by the electronic control unit 70.

In the turbocharger 40, the opening degree of the wastegate valve 44 is adjusted to thereby adjust the distribution ratio between the amount of exhaust gas flowing through the bypass pipe 36 and the amount of exhaust gas flowing through the turbine 42, the rotary driving force of the turbine 42, the amount of air compressed by the compressor 41, and the supercharging pressure (intake air pressure) of the engine 12. Specifically, the distribution ratio is adjusted such that when the opening degree of the wastegate valve 44 is smaller, the amount of exhaust gas flowing through the bypass pipe 36 is smaller and the amount of exhaust gas flowing through the turbine 42 is larger. When the wastegate valve 44 is fully open, the engine 12 can operate like a naturally aspirated engine that is not equipped with the turbocharger 40.

In the turbocharger 40, when the pressure inside the intake pipe 23, downstream of the compressor 41, is to some extent higher than the pressure upstream thereof, opening the blow-off valve 45 can release an excessive pressure on a downstream side of the compressor 41. Instead of being a valve controlled by the electronic control unit 70, the blow-off valve 45 may be configured as a check valve that opens when the pressure inside the intake pipe 23, downstream of the compressor 41, becomes to some extent higher than the pressure upstream thereof.

The evaporated fuel processing device 50 is a device that performs a purge of supplying evaporated fuel gas (purge gas) generated inside the fuel tank 11 to the intake pipe 23 of the engine 12, and includes an introduction passage 52, an on-off valve 53, a bypass passage 54, relief valves 55a, 55b, a canister 56, a common passage 61, a first purge passage 62, a second purge passage 63, a buffer part 64, a purge control valve 65, check valves 66, 67, a recirculation passage 68, and an ejector 69. The introduction passage 52 and the common passage 61 correspond to the "supply passage" of the embodiment.

The introduction passage 52 is connected to the fuel tank 11 and the canister 56. The on-off valve 53 is provided in the introduction passage 52 and configured as a normally closed solenoid valve. The on-off valve 53 is controlled by the electronic control unit 70.

The bypass passage 54 forms a bypass connecting two points in the introduction passage 52, one on the side of the fuel tank 11 and the other on the side of the canister 56 relative to the on-off valve 53, and has two branches 54a, 54b that split from the bypass passage 54 and then merge. The relief valve 55a is provided in the branch 54a and configured as a check valve, and opens when the pressure on the side of the fuel tank 11 becomes to some extent higher than the pressure on the side of the canister 56. The relief valve 55b is provided in the branch 54b and configured as a check valve, and opens when the pressure on the side of the canister 56 becomes to some extent higher than the pressure on the side of the fuel tank 11.

The canister 56 is connected to the introduction passage 52 and opens to the atmosphere through an atmospheric release passage 57. An inside of the canister 56 is filled with an adsorbent, such as activated carbon, that can adsorb evaporated fuel from the fuel tank 11. The atmospheric release passage 57 is provided with an air filter 58.

The common passage 61 is connected to the introduction passage 52, near the canister 56, and splits at a split point 61a into the first purge passage 62 and the second purge passage 63. The first purge passage 62 is connected to the intake pipe 23, between the throttle valve 26 and the surge tank 27. The second purge passage 63 is connected to a suction port of the ejector 69.

The buffer part 64 is provided in the common passage 61. An inside of the buffer part 64 is filled with an adsorbent, such as activated carbon, that can adsorb evaporated fuel from the fuel tank 11 and the canister 56. The purge control valve 65 is provided in the common passage 61, on the side of the split point 61a relative to the buffer part 64. The purge control valve 65 is configured as a normally closed solenoid valve. The purge control valve 65 is controlled by the electronic control unit 70.

The check valve 66 is provided in the first purge passage 62, near the split point 61a. The check valve 66 allows the evaporated fuel gas (purge gas) containing evaporated fuel to flow through a purge passage 60 in a direction from the side of the common passage 61 toward the side of the first purge passage 62 (intake pipe 23) and prohibits the evaporated fuel gas from flowing in the opposite direction. The check valve 67 is provided in the second purge passage 63, near the split point 61a. The check valve 67 allows the evaporated fuel gas to flow through the purge passage 60 in a direction from the side of the common passage 61 toward the side of the second purge passage 63 (ejector 69) and prohibits the evaporated fuel gas from flowing in the opposite direction.

The recirculation passage 68 is connected to the intake pipe 23, between the compressor 41 and the intercooler 25, and to an intake port of the ejector 69. The ejector 69 has the intake port, the suction port, and an exhaust port. The ejector 69 has the intake port connected to the recirculation passage 68, the suction port connected to the second purge passage 63, and the exhaust port connected to the intake pipe 23, upstream of the compressor 41. A leading end part of the intake port has a tapered shape.

In the ejector 69, a pressure difference occurs between the intake port and the exhaust port when the turbocharger 40 is operating (when the pressure inside the intake pipe 23, between the compressor 41 and the intercooler 25, is a positive pressure), so that recirculating intake air (intake air that is recirculated from downstream of the compressor 41 in the intake pipe 23 through the recirculation passage 68) flows from the intake port toward the exhaust port. As the recirculating intake air is depressurized in the leading end part of the intake port, a negative pressure occurs near the leading end part. This negative pressure causes the evaporated fuel gas to be suctioned from the second purge passage 63 through the suction port, and this evaporated fuel gas is supplied, along with the recirculating intake air having a negative pressure, to the intake pipe 23, upstream of the compressor 41, through the exhaust port.

The evaporated fuel processing device 50 thus configured operates basically as follows: When the pressure inside the intake pipe 23, downstream of the throttle valve 26 (a surge pressure Ps to be described later) is a negative pressure and the on-off valve 53 and the purge control valve 65 are open, the check valve 66 opens, so that evaporated fuel gas (purge gas) generated inside the fuel tank 11 and evaporated fuel gas desorbed from the canister 56 are supplied to the intake pipe 23, downstream of the throttle valve 26, through the introduction passage 52, the common passage 61, and the first purge passage 62. Hereinafter, this action will be referred to as a "downstream purge." In this case, if the pressure inside the intake pipe 23, between the compressor 41 and the intercooler 25 (a supercharging pressure Pc to be described later) is a negative pressure or zero, the ejector 69 will not operate and therefore the check valve 66 will not open.

When the pressure inside the intake pipe 23, between the compressor 41 and the intercooler 25 (supercharging pressure Pc) is a positive pressure and the on-off valve 53 and the purge control valve 65 are open, the ejector 69 operates and the check valve 67 opens, so that the evaporated fuel gas is supplied to the intake pipe 23, upstream of the compressor 41, through the introduction passage 52, the common passage 61, the second purge passage 63, and the ejector 69. Hereinafter, this action will be referred to as an "upstream purge." In this case, the check valve 66 opens or closes according to the pressure inside the intake pipe 23, downstream of the throttle valve 26 (surge pressure Ps).

Thus, the evaporated fuel processing device 50 performs only the downstream purge or the upstream purge of the two types of purges, or both the downstream purge and the upstream purge, depending on the pressure inside the intake pipe 23, downstream of the throttle valve 26 (surge pressure Ps) and the pressure inside the intake pipe 23, between the compressor 41 and the intercooler 25 (supercharging pressure Pc).

The electronic control unit 70 is configured as a microprocessor centered around a CPU, and incudes, in addition to the CPU, a ROM that stores processing programs, a RAM that temporarily stores data, a non-volatile flash memory that stores and retains data, input and output ports, and a communication port. Signals from various sensors are input into the electronic control unit 70 through the input port.

Examples of the signals input into the electronic control unit 70 include a tank internal pressure Ptnk from an internal pressure sensor 11a that detects the pressure inside the fuel tank 11; a crank angle θcr from a crank position sensor 14a that detects the rotation position of the crankshaft 14 of the engine 12; a coolant temperature Tw from a coolant temperature sensor 16 that detects the temperature of a coolant in the engine 12; and a throttle valve opening degree TH from a throttle position sensor 26a that detects the opening degree of the throttle valve 26. A further example is a cam position θca from a cam position sensor (not shown) that detects the rotation position of an intake cam shaft that opens and closes the intake valve 29 or an exhaust cam shaft that opens and closes the exhaust valve 34. Further examples are an intake air amount Qa from an air flow meter 23a mounted on the intake pipe 23, upstream of the compressor 41; an intake air temperature Tin from an intake air temperature sensor 23t mounted on the intake pipe 23, upstream of the compressor 41; an intake air pressure (pre-compressor pressure) Pin from an intake air pressure sensor 23b mounted on the intake pipe 23, upstream of the compressor 41; and the supercharging pressure Pc from a supercharging pressure sensor 23c mounted on the intake pipe 23, between the compressor 41 and the intercooler 25. Further examples are the surge pressure (post-throttle-valve pressure) Ps from a surge pressure sensor 27a mounted on the surge tank 27, and a surge temperature Ts from a temperature sensor 27b mounted on the surge tank 27. A further example is a supply fuel pressure Pfd from a fuel pressure sensor 28a that detects the fuel pressure of fuel supplied to the cylinder injection valve 28. Further examples are a front air-fuel ratio AF1 from a front air-fuel ratio sensor 35a mounted on the exhaust pipe 35, upstream of the exhaust gas control apparatus 37, and a rear air-fuel ratio AF2 from a rear air-fuel ratio sensor 35b mounted on the exhaust pipe 35, between the exhaust gas control apparatus 37 and the exhaust gas control apparatus 38. Further examples are an opening degree Opv of the purge control valve 65 from a purge control valve position sensor 65a, and a sensor signal Pobd from an OBD sensor (pressure sensor) 63a mounted in the second purge passage 63.

Various control signals are output from the electronic control unit 70 through the output port. Examples of the signals output from the electronic control unit 70 include a control signal to the throttle valve 26, a control signal to the cylinder injection valve 28, and a control signal to the spark plug 31. Further examples are a control signal to the wastegate valve 44, a control signal to the blow-off valve 45, and a control signal to the on-off valve 53. Another example is a control signal to the purge control valve 65.

The electronic control unit 70 calculates a speed Ne and a load factor (a ratio of the volume of air actually taken into the engine 12 during one cycle relative to the stroke volume per cycle of the engine 12) KL of the engine 12. The speed Ne is calculated based on the crank angle $\theta cr$ from the crank position sensor 14a. The load factor KL is calculated based on the intake air amount Qa from the air flow meter 23a and the speed Ne.

In the engine device 10 of the embodiment thus configured, the electronic control unit 70 performs, based on a required load factor KL* of the engine 12, modes of control including intake air amount control of controlling the opening degree of the throttle valve 26, fuel injection control of controlling the amount of fuel injected from the cylinder injection valve 28, ignition control of controlling the ignition timing of the spark plug 31, supercharge control of controlling the opening degree of the wastegate valve 44, and purge control of controlling the opening degree of the purge control valve 65. In the following, the fuel injection control and the purge control will be described. The intake air amount control, the ignition control, and the supercharge control do not constitute the core of the present disclosure and therefore a detailed description thereof will be omitted.

Figure 3:
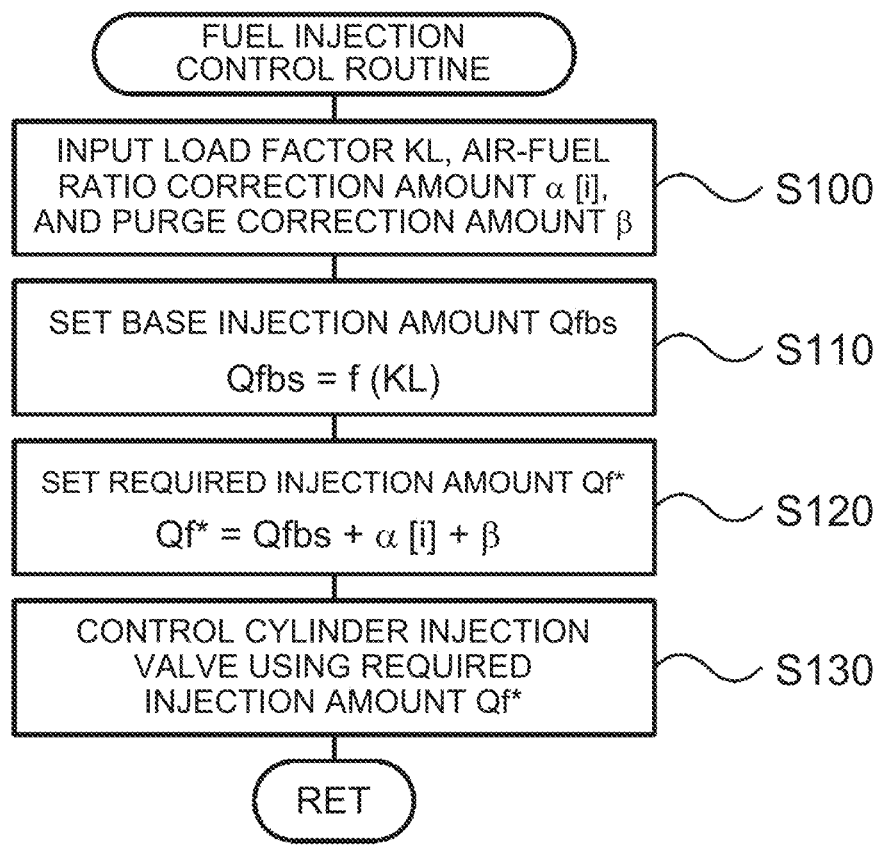
FIG. 3 is a flowchart showing one example of a fuel injection control routine.

The fuel injection control will be described. FIG. 3 is a flowchart showing one example of a fuel injection control routine. This routine is repeatedly executed by the electronic control unit 70. When this routine is executed, the electronic control unit 70 inputs pieces of data including the load factor KL of the engine 12, an air-fuel ratio correction amount $\alpha$ [i], and a purge correction amount $\beta$ (step S100).

Figure 4:
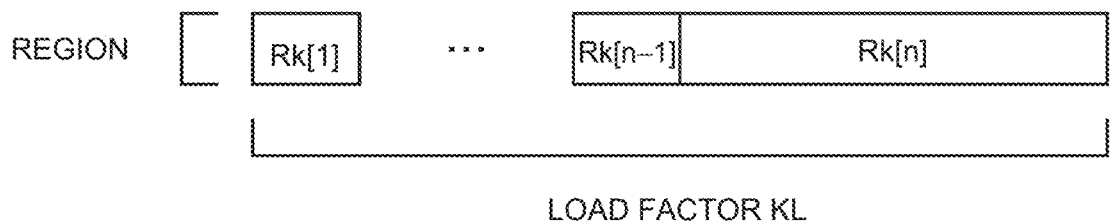
FIG. 4 is a chart illustrating one example of a plurality of load factor regions Rk [1] to Rk [n]

As the load factor KL of the engine 12, a value calculated based on the intake air amount Qa and the speed Ne is input. The air-fuel ratio correction amount $\alpha$ [i] is a correction amount related to a deviation (offset amount) of the front air-fuel ratio sensor 35a for an applicable region (a region number i (i: one of 1 to n)) to which a current load factor KL belongs among a plurality of load factor regions Rk [1] to Rk [n] (n: a total number of regions) into which the range of the load factor KL is divided. As the air-fuel ratio correction amount $\alpha$ [i], a value set by an air-fuel ratio correction amount setting routine, to be described later, is input. FIG. 4 is a chart illustrating one example of the load factor regions Rk [1] to Rk [n]. In the embodiment, as shown, the load factor regions Rk [1] to Rk [n] are set by dividing a range expected of the load factor KL into load factor regions Rk [1], ..., Rk [n] in increasing order of the load factor KL such that the load factor region Rk [n] of the highest load factor has a larger width (covers a wider range of the load factor KL) than the other load factor regions Rk [1] to Rk [n−1]. The purge correction amount $\beta$ is a correction amount related to the downstream purge and the upstream purge, and a value set by a purge correction amount setting routine, to be described later, is input as the purge correction amount $\beta$.

Subsequently, a base injection amount Qfbs of the cylinder injection valve 28 is set based on the load factor KL (step S110), and a required injection amount Qf* of the cylinder injection valve 28 is set by adding the air-fuel ratio correction amount $\alpha$ [i] and the purge correction amount $\beta$ to the set base injection amount Qfbs (step S120). The cylinder injection valve 28 is controlled using the set required injection amount Qf* (step S130), and this routine is ended. The base injection amount Qfbs is a base value of the required injection amount Qf* of the cylinder injection valve 28 that is required for the air-fuel ratio of the air-fuel mixture inside the combustion chamber 30 to meet a required air-fuel ratio AF*. As the base injection amount Qfbs, for example, a value is set that is calculated as the product of the load factor KL and a unit injection amount (an amount of injection per 1% of the load factor KL) Qfpu of the cylinder injection valve 28 that is required for the air-fuel ratio of the air-fuel mixture inside the combustion chamber 30 to meet the required air-fuel ratio AF*.

Next, a process of setting air-fuel ratio correction amounts $\alpha$ [1] to $\alpha$ [n] for the respective load factor regions Rk [1] to Rk [n] used in the fuel injection amount control routine of FIG. 3 will be described using the air-fuel ratio correction amount setting routine of FIG. 5. This routine is repeatedly executed by the electronic control unit 70. Until set in the current trip, the air-fuel ratio correction amounts $\alpha$ [1] to $\alpha$ [n] for the respective load factor regions Rk [1] to Rk [n] have initial values or values that were set last during the last trip or an earlier trip.

Figure 5:
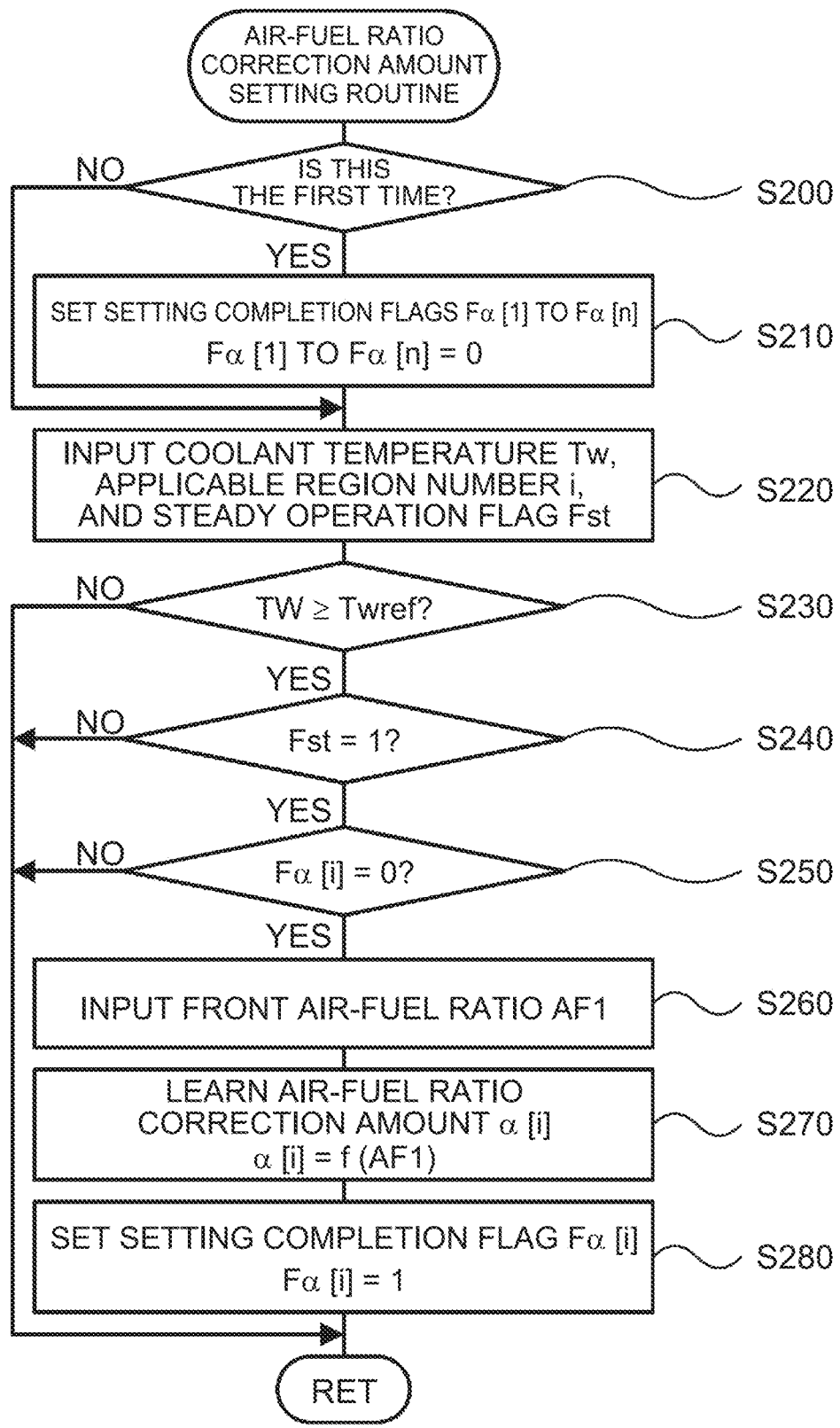
FIG. 5 is a flowchart showing one example of an air-fuel ratio correction amount setting routine.

When the air-fuel ratio correction amount setting routine of FIG. 5 is executed, the electronic control unit 70 first determines whether this routine is executed for the first time in the current trip (step S200). When it is determined that this routine is executed for the first time in the current trip, the electronic control unit 70 resets the values of all setting completion flags F$\alpha$ [1] to F$\alpha$ [n] for the load factor regions Rk [1] to Rk [n] to zero as an initial value (step S210). The setting completion flags F$\alpha$ [1] to F$\alpha$ [n] are flags indicating whether the air-fuel ratio correction amounts $\alpha$ [1] to $\alpha$ [n] have been set in the current trip. When it is determined in step S200 that this routine is executed not for the first time in the current trip, the process of step S210 is not executed.

Subsequently, the electronic control unit 70 inputs pieces of data including the coolant temperature Tw and a steady operation flag Fst of the engine 12, and the region number i of the applicable region to which the current load factor KL belongs among the load factor regions Rk [1] to Rk [n] (step S220). As the coolant temperature Tw, a value detected by the coolant temperature sensor 16 is input. As the steady operation flag Fst, a value set by a steady operation flag setting routine (not shown) is input. In the steady operation flag setting routine, the electronic control unit 70 determines whether the engine 12 is in steady operation using at least one of the speed Ne, the intake air amount Qa, and the load factor KL of the engine 12. The electronic control unit 70 sets the value of the steady operation flag Fst to one when it is determined that the engine 12 is in steady operation, and sets the value of the steady operation flag Fst to zero when it is determined that the engine 12 is not in steady operation. As the region number i of the applicable region, a value that is set based on the load factor KL and the load factor regions Rk [1] to Rk [n] is input.

Then, the coolant temperature Tw is compared with a threshold value Twref (step S230), and the value of the steady operation flag Fst is checked (step S240). As the threshold value Twref, for example, about 55° C. to 65° C. is used. The processes of steps S230 and S240 are processes of determining whether conditions for setting the air-fuel ratio correction amount $\alpha$ [i] for the region number i are met. When the coolant temperature Tw is lower than the threshold value Twref in step S230, or when the value of the steady operation flag Fst is zero in step S240, it is determined that the conditions for setting the air-fuel ratio correction amount $\alpha$ [i] for the region number i are not met, and this routine is ended.

When the coolant temperature Tw is equal to or higher than the threshold value Twref in step S230 and the value of the steady operation flag Fst is one in step S240, it is determined that the conditions for setting the air-fuel ratio correction amount $\alpha$ [i] for the region number i are met, and the value of the setting completion flag F$\alpha$ [i] for the region number i is checked (step S250). When the value of the setting completion flag F$\alpha$ [i] for the region number i is zero, it is determined that the air-fuel ratio correction amount $\alpha$ [i] for the region number i has not been set in the current trip. Then, the front air-fuel ratio AF1 is input (step S260), and the air-fuel ratio correction amount $\alpha$ [i] for the region number i is set based on the input front air-fuel ratio AF1 (step S270). The value of the setting completion flag F$\alpha$ [i] for the region number i is set to one (step S280), and this routine is ended.

Figure 6:
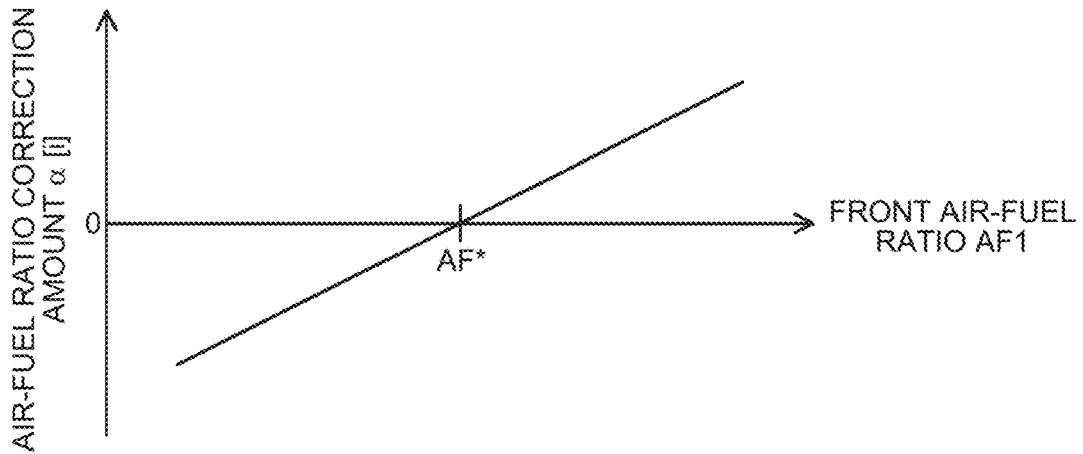
FIG. 6 is a graph illustrating one example of an air-fuel ratio correction amount setting map.

As the front air-fuel ratio AF1, a value detected by the front air-fuel ratio sensor 35a is input. The air-fuel ratio correction amount $\alpha$ [i] for the region number i can be obtained by applying the front air-fuel ratio AF1 at the time when the conditions for setting the air-fuel ratio correction amount $\alpha$ [i] are met to an air-fuel ratio correction amount setting map. The air-fuel ratio correction amount setting map is specified in advance by experiment or analysis as a relationship between the front air-fuel ratio AF1 at the time when the conditions for setting the air-fuel ratio correction amount $\alpha$ [i] for the region number i are met and the air-fuel ratio correction amount $\alpha$ [i], and is stored in the ROM or the flash memory (not shown). FIG. 6 is a graph illustrating one example of the air-fuel ratio correction amount setting map. As shown, the air-fuel ratio correction amount $\alpha$ [i] is set such that, when the front air-fuel ratio AF1 at the time when the setting conditions are met is on a rich side or a lean side relative to the required air-fuel ratio AF*, the absolute value of the air-fuel ratio correction amount $\alpha$ [i] becomes larger within a negative range or a positive range as the difference between the front air-fuel ratio AF1 and the required air-fuel ratio AF* becomes larger (as the front air-fuel ratio AF1 deviates further from the required air-fuel ratio AF*). When the air-fuel ratio correction amount $\alpha$ [i] is smaller, the cylinder injection valve 28 is controlled in the fuel injection control routine of FIG. 3 with the required injection amount Qf* reduced accordingly. Since the load factor regions Rk [1] to Rk [n] are set such that the load factor region Rk [n] of the highest load factor becomes wider than the other load factor regions Rk [1] to Rk [n−1] as described above (see FIG. 4), the reliability of the air-fuel ratio correction amount $\alpha$ [n] for the load factor region Rk [n] is lower than the reliabilities of the air-fuel ratio correction amounts $\alpha$ [1] to $\alpha$ [n−1] for the load factor regions Rk [1] to Rk [n−1].

When the value of the setting completion flag F$\alpha$ [i] for the region number i is one in step S250, it is determined that the air-fuel ratio correction amount $\alpha$ [i] for the region number i has been set in the current trip, and this routine is ended without the processes of steps S260 to S280 being executed.

Figure 7:
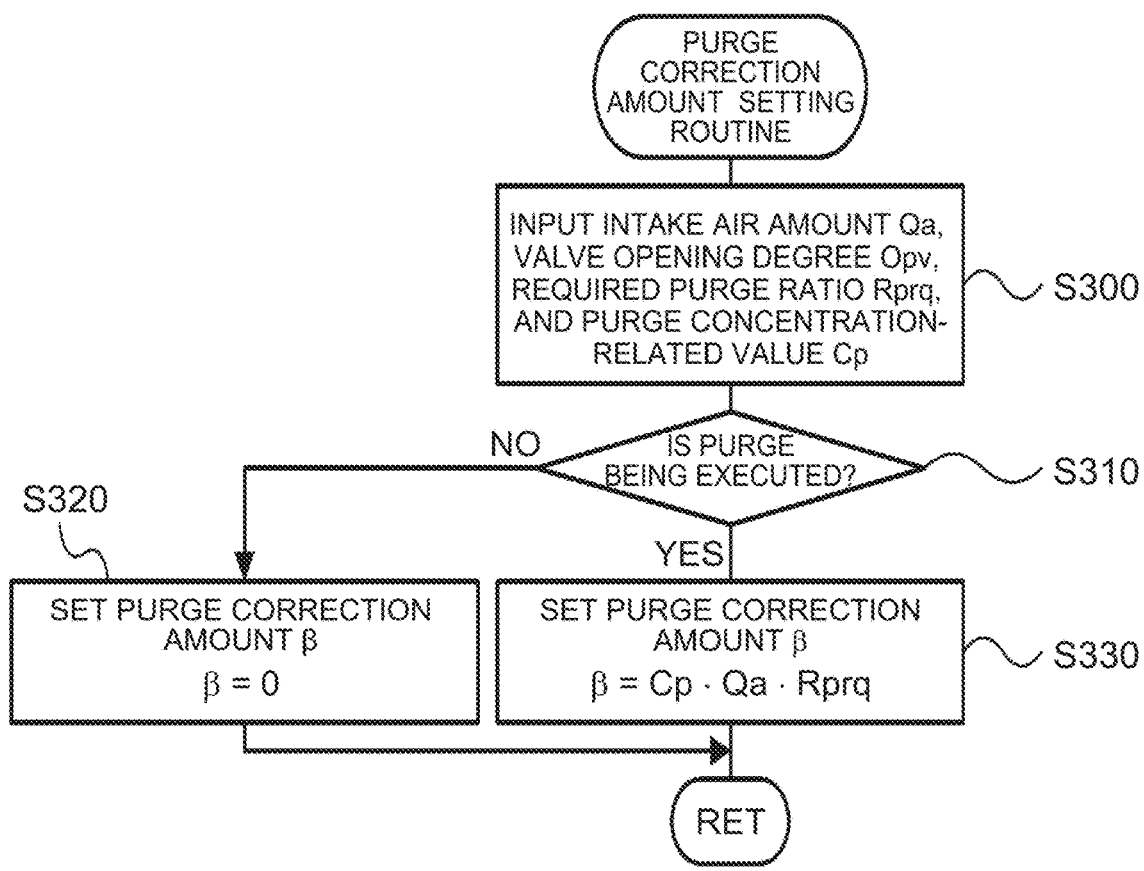
FIG. 7 is a flowchart showing one example of a purge correction amount setting routine.

Next, a process of setting the purge correction amount $\beta$ used in the fuel injection amount control routine of FIG. 3 will be described using the purge correction amount setting routine of FIG. 7. This routine is repeatedly executed by the electronic control unit 70. When this routine is executed, the electronic control unit 70 first inputs pieces of data including the intake air amount Qa, the opening degree Opv of the purge control valve 65, the required purge ratio Rprq, and the purge concentration-related value Cp (step S300).

As the intake air amount Qa, a value detected by the air flow meter 23a is input. As the opening degree Opv of the purge control valve 65, a value detected by the purge control valve position sensor 65a is input. As the required purge ratio Rprq, a value set by a purge control routine, to be described later, is input. The value of the required purge ratio Rprq is set to zero when a purge condition, to be described later, is not met (when the purge control is not executed). The purge concentration-related value Cp is a correction factor related to the deviation of the air-fuel ratio inside the combustion chamber 30 (the front air-fuel ratio AF1 detected by the front air-fuel ratio sensor 35a) per 1% of the purge ratio from the required air-fuel ratio AF*. When the purge concentration-related value Cp is a negative value, this means that a gas passing through the purge control valve 65 contains evaporated fuel, and when the purge concentration-related value Cp is equal to or larger than zero, this means that the gas passing through the purge control valve 65 does not contain evaporated fuel. As the purge concentration-related value Cp, a value set by a purge concentration-related value learning routine, to be described later, is input. The purge concentration-related value Cp is set to zero as an initial value when a trip is started. The "purge concentration" means the concentration of evaporated fuel in evaporated fuel gas, and the "purge ratio" means the ratio of the evaporated fuel gas to an intake air amount.

When the pieces of data are thus input, it is determined whether a purge is being executed using the input opening degree Opv of the purge control valve 65 (step S310). When it is determined that a purge is not being executed, the value of the purge correction amount $\beta$ is set to zero (step S320), and this routine is ended.

When it is determined in step S310 that a purge is being executed, the product of the purge concentration-related value Cp, the intake air amount Qa, and the required purge ratio Rprq is set as the purge correction amount $\beta$ (step S330), and this routine is ended. The purge correction amount $\beta$ thus set has a negative value when the purge concentration-related value Cp is a negative value, and the absolute value of the purge correction amount $\beta$ as a negative value becomes larger as the absolute value of the purge concentration-related value Cp becomes larger, and becomes larger as the intake air amount Qa or the required purge ratio Rprq becomes larger or higher. The purge correction amount β becomes zero when the purge concentration-related value Cp is zero. Further, the purge correction amount β has a positive value when the purge concentration-related value Cp is a positive value, and the absolute value of the purge correction amount β as a positive value becomes larger as the absolute value of the purge concentration-related value Cp becomes larger, and becomes larger as the intake air amount Qa or the required purge ratio Rprq becomes larger or higher. When the purge correction amount β is smaller, the cylinder injection valve 28 is controlled in the fuel injection control routine of FIG. 3 with the required injection amount Qf* reduced accordingly.

Figure 8:
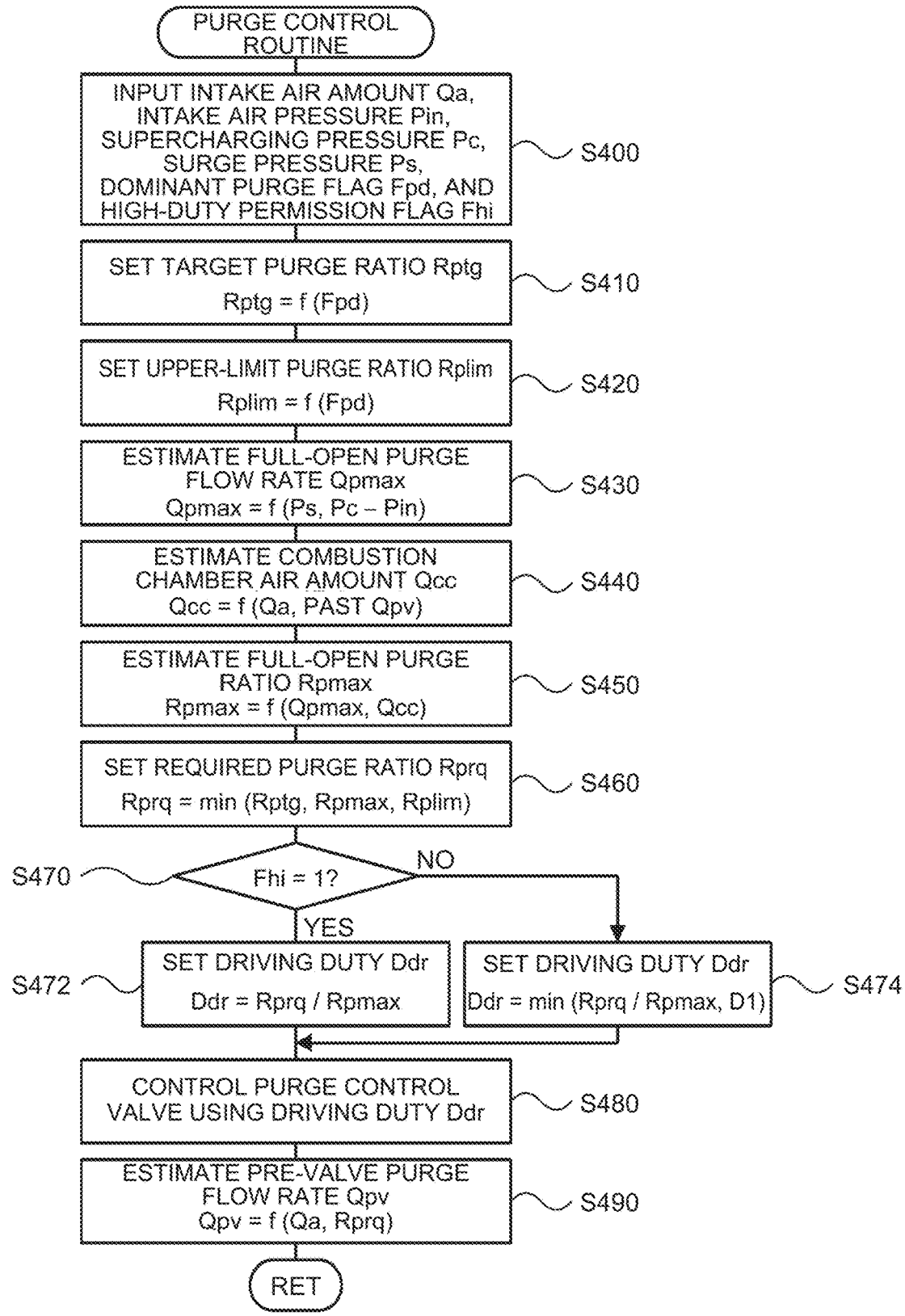
FIG. 8 is a flowchart showing one example of a purge control routine.
Figure 9:
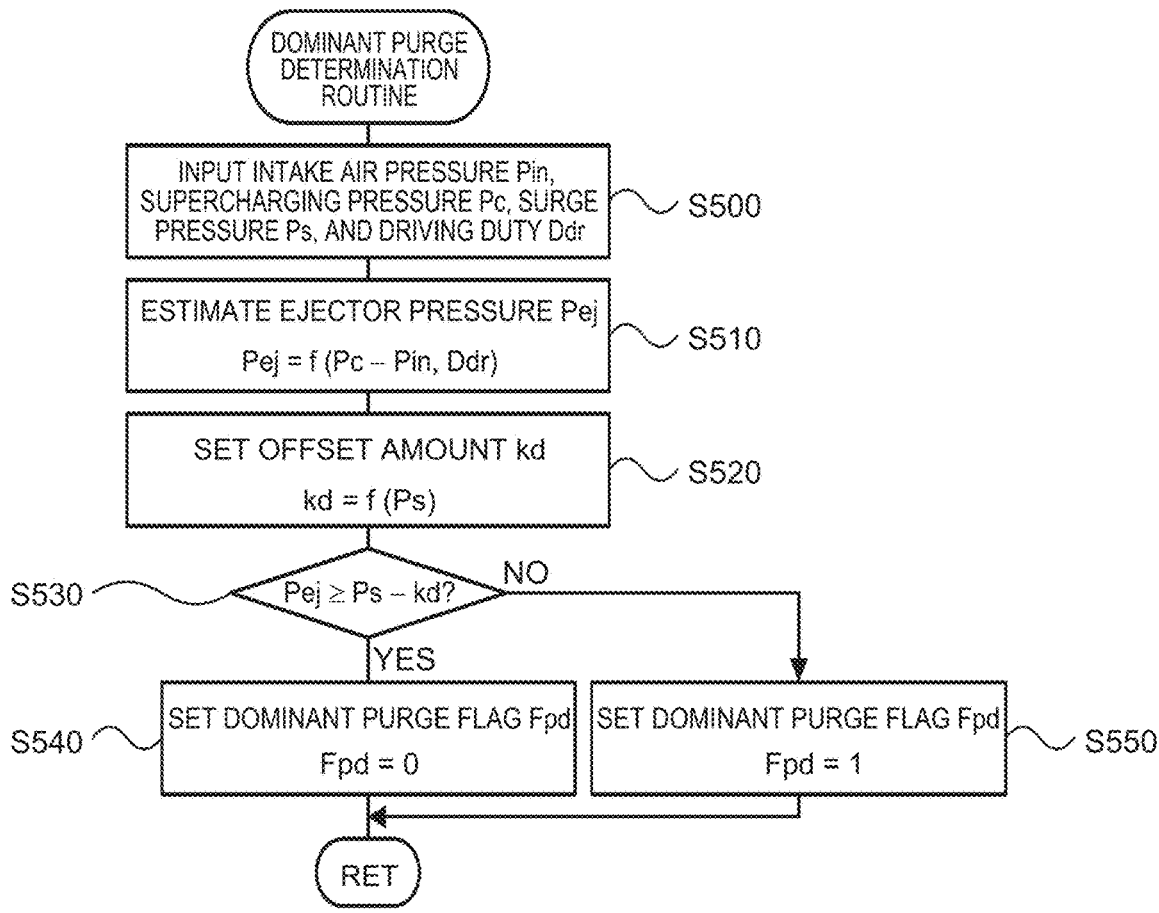
FIG. 9 is a flowchart showing one example of a dominant purge determination routine.

Next, the purge control will be described. FIG. 8 is a flowchart showing one example of the purge control routine. FIG. 9 is a flowchart showing one example of a dominant purge determination routine for determining a dominant purge that is dominant one of the downstream purge and the upstream purge. These routines are repeatedly executed by the electronic control unit 70 when the purge condition is met (when a purge is executed). As the purge condition, for example, a condition is used that operation control (the fuel injection control etc.) of the engine 12 is being performed and the value of the setting completion flag Fα [i] for the applicable region (region number i) to which the current load factor KL belongs among the load factor regions Rk [1] to Rk [n] is one (the air-fuel ratio correction amount α [i] has been set in the current trip). In the following, to simplify the description, determination of the dominant purge will be described first using the dominant purge determination routine of FIG. 9, and then the purge control based on this determination will be described using the purge control routine of FIG. 8.

When the dominant purge determination routine of FIG. 9 is executed, the electronic control unit 70 first inputs pieces of data including the intake air pressure Pin, the supercharging pressure Pc, the surge pressure Ps, and a driving duty Ddr (step S500). As the intake air pressure Pin, a value detected by the intake air pressure sensor 23b is input. As the supercharging pressure Pc, a value detected by the supercharging pressure sensor 23c is input. As the surge pressure Ps, a value detected by the surge pressure sensor 27a is input. As the driving duty Ddr, a value set by the purge control routine of FIG. 8 is input.

Figure 10:
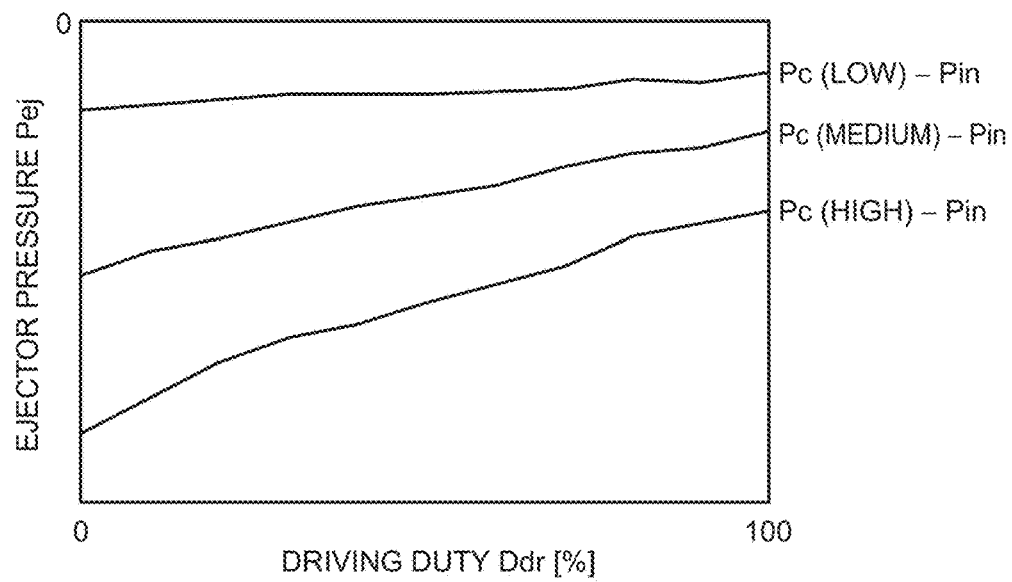
FIG. 10 is a graph illustrating one example of an ejector pressure setting map.

When the pieces of data are thus input, an ejector pressure Pej is estimated based on a value obtained by subtracting the intake air pressure Pin from the supercharging pressure Pc and on the driving duty Ddr (step S510). The ejector pressure Pej can be obtained by applying the value obtained by subtracting the intake air pressure Pin from the supercharging pressure Pc and the driving duty Ddr to an ejector pressure setting map. The ejector pressure setting map is specified in advance by experiment or analysis as a relationship among the value obtained by subtracting the intake air pressure Pin from the supercharging pressure Pc, the driving duty Ddr, and the ejector pressure Pej, and is stored in the ROM or the flash memory (not shown). FIG. 10 is a graph illustrating one example of the ejector pressure setting map. As shown, the ejector pressure Pej is set so as to become higher (have a smaller absolute value as a negative value) as the driving duty Ddr becomes higher, and become lower (have a larger absolute value as a negative value) as the supercharging pressure Pc (the value obtained by subtracting the intake air pressure Pin from the supercharging pressure Pc) becomes higher.

Figure 11:
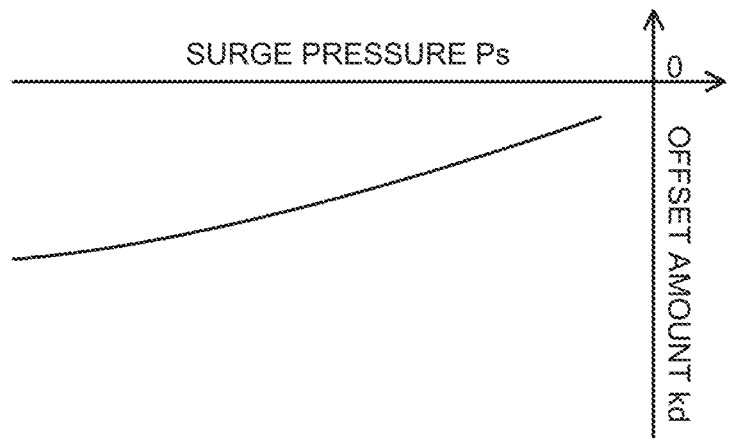
FIG. 11 is a graph illustrating one example of an offset amount setting map when the cross-sectional area of a second purge passage 63 is small relatively to the cross-sectional area of a first purge passage 62.

Subsequently, based on the surge pressure Ps, an offset amount kd is set by which the surge pressure Ps is offset to correct the influence based on the cross-sectional area of the second purge passage 63 relative to the cross-sectional area of the first purge passage 62 (step S520). The offset amount kd can be obtained by applying the surge pressure Ps to an offset amount setting map. The offset amount setting map is specified in advance by experiment or analysis as a relationship between the surge pressure Ps and the offset amount kd, and is stored in the ROM or the flash memory (not shown). FIG. 11 is a graph illustrating one example of the offset amount setting map when the cross-sectional area of the second purge passage 63 is small relatively to the cross-sectional area of the first purge passage 62. As shown, the offset amount kd is set such that the absolute value thereof as a negative value becomes larger as the absolute value of the surge pressure Ps as a negative value becomes larger. This is because the influence based on the cross-sectional area of the second purge passage 63 relative to the cross-sectional area of the first purge passage 62 becomes greater as the absolute value of the surge pressure Ps as a negative value becomes larger. When the first purge passage 62 and the second purge passage 63 are formed by pipes, since the cross-sectional area is proportional to the square of the pipe diameter, the influence based on the cross-sectional area of the second purge passage 63 relative to the cross-sectional area of the first purge passage 62 can be rephrased as an influence based on the pipe diameter of the second purge passage relative to the pipe diameter of the first purge passage 62.

Then, the ejector pressure Pej and a value obtained by subtracting the offset amount kd from the surge pressure Ps are compared (step S530). When it is determined that the ejector pressure Pej is equal to or higher than the value obtained by subtracting the offset amount kd from the surge pressure Ps (the absolute value of the ejector pressure Pej as a negative value is equal to or smaller than that value), it is concluded that the evaporated fuel gas flows dominantly through the first purge passage 62 (that the dominant purge is the downstream purge). The value of a dominant purge flag Fpd is set to zero (step S540), and this routine is ended.

When it is determined in step S530 that the ejector pressure Pej is smaller than the value obtained by subtracting the offset amount kd from the surge pressure Ps (the absolute value of the ejector pressure Pej as a negative value is larger than that value), it is concluded that the evaporated fuel gas flows dominantly through the second purge passage 63 (that the dominant purge is the upstream purge). The value of the dominant purge flag Fpd is set to one (step S550), and this routine is ended.

Thus, in the embodiment, the offset amount kd for correcting the influence based on the cross-sectional area of the second purge passage relative to the cross-sectional area of the first purge passage 62 is set based on the surge pressure Ps, and the ejector pressure Pej and the value obtained by subtracting the offset amount kd from the surge pressure Ps are compared to determine which of the downstream purge and the upstream purge is the dominant purge. In this way, the dominant purge can be more appropriately determined than when the influence based on the cross-sectional area of the second purge passage relative to the cross-sectional area of the first purge passage 62 is not taken into account.

Next, the purge control will be described using the purge control routine of FIG. 8. When this routine is executed, the electronic control unit 70 first inputs pieces of data including the intake air amount Qa, the intake air pressure Pin, the supercharging pressure Pc, the surge pressure Ps, the dominant purge flag Fpd, and a permission flag Fhi (step S400). As the intake air amount Qa, a value detected by the air flow meter 23a is input. As the intake air pressure Pin, a value detected by the intake air pressure sensor 23b is input. As the supercharging pressure Pc, a value detected by the supercharging pressure sensor 23c is input. As the surge pressure Ps, a value detected by the surge pressure sensor 27a is input. As the dominant purge flag Fpd, a value set by the dominant purge determination routine of FIG. 9 is input. The value of the permission flag Fhi is set to one when control of the purge control valve 65 using a high duty (a duty higher than a relatively low predetermined duty D1 to be described later) (hereinafter referred to as "high-duty control") is permitted, and is set to zero when the high-duty control is prohibited. As the permission flag Fhi, a value set by a purge concentration-related value learning routine, to be described later, is input. The value of the permission flag Fhi is set to zero as an initial value when a trip is started.

Subsequently, a target purge ratio Rptg is set based on the dominant purge flag Fpd (step S410). The target purge ratio Rptg is set so as to increase gradually from a starting purge ratio Rpst1 (e.g., by rate processing using a rate value ΔRp1) during a period in which the purge condition is met for the first time in each trip (a period from when the purge condition starts to be met until meeting of the purge condition is interrupted or ended). Further, the target purge ratio Rptg is set so as to increase gradually from a resuming purge ratio Rpst2 (e.g., by rate processing using a rate value ΔRp2) during a period in which the purge condition is met for the second time or a subsequent time in each trip (a period from when meeting of the purge condition is resumed until it is interrupted or ended). As the starting purge ratio Rpst1 and the resuming purge ratio Rpst2, relatively small values are used to mitigate fluctuations in the air-fuel ratio of the engine 12. At least one of the value of the starting purge ratio Rpst1, the value of the resuming purge ratio Rpst2, and the rate values ΔRp1, ΔRp2 is set to a smaller value when the value of the dominant purge flag Fpd is one, i.e., when the dominant purge is the upstream purge, than when the value of the dominant purge flag Fpd is zero, i.e., when the dominant purge is the downstream purge. Examples of the case where meeting of the purge condition is interrupted include a case where an accelerator pedal is released and fuel to the engine 12 is cut off while the vehicle equipped with the engine device 10 is traveling.

Then, an upper-limit purge ratio Rplim is set based on the dominant purge flag Fpd (step S420). The value of the upper-limit purge ratio Rplim is set to a smaller value when the value of the dominant purge flag Fpd is one, i.e., when the dominant purge is the upstream purge, than when the value of the dominant purge flag Fpd is zero, i.e., when the dominant purge is the downstream purge.

Figure 12:
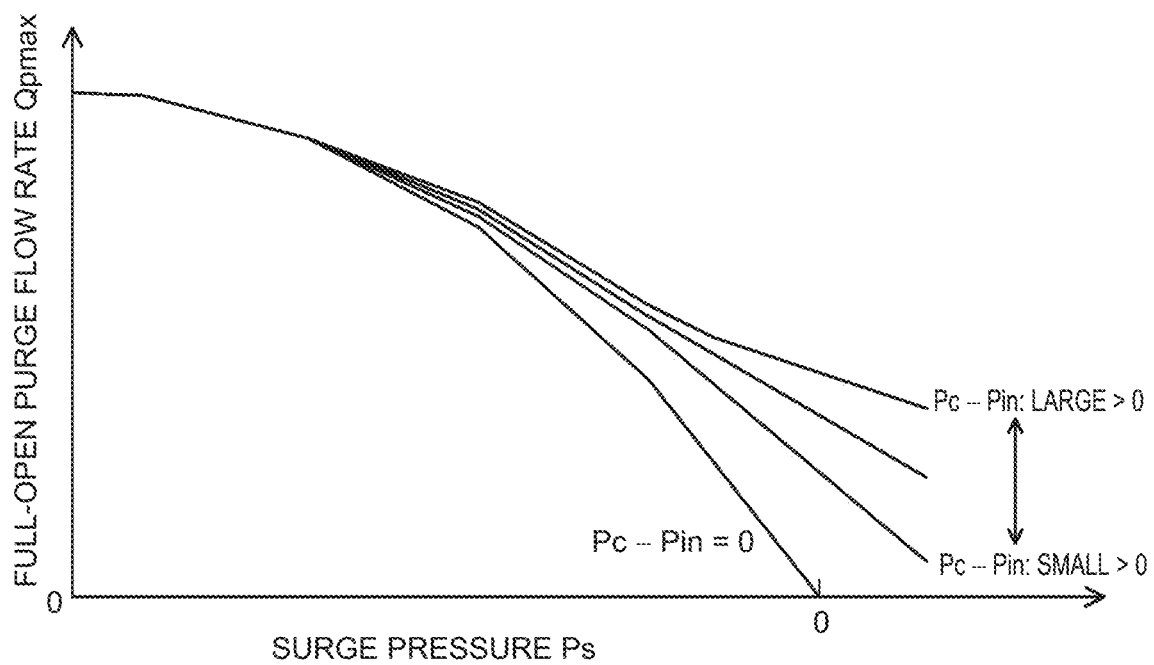
FIG. 12 is a graph illustrating one example of a full-open purge flow rate estimation map.

Further, a full-open purge flow rate Qpmax is estimated based on the surge pressure Ps and the value obtained by subtracting the intake air pressure Pin from the supercharging pressure Pc (step S430). The full-open purge flow rate Qpmax is a purge flow rate (the volume flow rate of the evaporated fuel gas supplied to the intake pipe 23) when the driving duty of the purge control valve 65 is 100%. The full-open purge flow rate Qpmax can be obtained by applying the surge pressure Ps and the value obtained by subtracting the intake air pressure Pin from the supercharging pressure Pc to a full-open purge flow rate estimation map. The full-open purge flow rate estimation map is specified in advance by experiment or analysis as a relationship among the surge pressure Ps, the value obtained by subtracting the intake air pressure Pin from the supercharging pressure Pc, and the full-open purge flow rate Qpmax, and is stored in the ROM or the flash memory (not shown). FIG. 12 is a graph illustrating one example of the full-open purge flow rate estimation map. As shown, the full-open purge flow rate Qpmax is set so as to become higher as the surge pressure Ps becomes lower (the absolute value thereof as a negative value becomes larger) and as the value obtained by subtracting the intake air pressure Pin from the supercharging pressure Pc becomes larger.

In addition, a combustion chamber air amount Qcc that is an amount of air inside the combustion chamber 30 is estimated based on the intake air amount Qa and the pre-valve purge flow rate (past Qpv) of a predetermined time T1 ago (step S440). The pre-valve purge flow rate Qpv is a flow rate of the evaporated fuel gas in the common passage 61, on the side of the introduction passage 52 relative to the purge control valve 65. If a purge was being executed the predetermined time T1 ago, a value that is estimated by the process of step S490, to be described later, during execution of this routine of the predetermined time T1 ago is used as the pre-valve flow rate (past Qpv) of the predetermined time T1 ago, and if a purge was not being executed the predetermined time T1 ago, zero is used as the value of the pre-valve flow rate of the predetermined time T1 ago. The predetermined time T1 is specified as a time taken for the evaporated fuel gas in the common passage 61, on the side of the introduction passage 52 relative to the purge control valve 65, to reach the combustion chamber 30. As the predetermined time T1, a time based on the dominant purge flag Fpd or the speed Ne of the engine 12 may be used, or for simplicity's sake, a fixed time may be used. The combustion chamber air amount Qcc can be obtained by, for example, applying the intake air amount Qa and the past pre-valve purge flow rate (past Qpv) to a combustion chamber air amount estimation map. The combustion chamber air amount estimation map is specified in advance by experiment or analysis as a relationship between the intake air amount Qa and the past pre-valve purge flow rate (past Qpv), and the combustion chamber air amount Qcc, and is stored in the ROM or the flash memory (not shown).

When the full-open purge flow rate Qpmax and the combustion chamber air amount Qcc are thus estimated, a full-open purge ratio Rpmax is estimated based on these full-open purge flow rate Qpmax and combustion chamber air amount Qcc (step S450). The full-open purge ratio Rpmax can be calculated by dividing the full-open purge flow rate Qpmax by the combustion chamber air amount Qcc. Subsequently, the required purge ratio Rprq is set by limiting the target purge ratio Rptg by the full-open purge ratio Rpmax and the upper-limit purge ratio Rplim (by setting the upper limit) (step S460). Specifically, the smallest value of the target purge ratio Rptg, the full-open purge ratio Rpmax, and the upper-limit purge ratio Rplim is set as the required purge ratio Rprq.

Then, the value of the permission flag Fhi is checked (step S470). When the value of the permission flag Fhi is one, i.e., when the high-duty control is permitted, the driving duty Ddr of the purge control valve 65 is set by dividing the required purge ratio Rprq by the full-open purge ratio Rpmax (step S472), and the purge control valve 65 is controlled using the set driving duty Ddr (step S480).

When the value of the permission flag Fhi is zero in step S470, i.e., when the high-duty control is prohibited, the driving duty Ddr of the purge control valve 65 is set by dividing the required purge ratio Rprq by the full-open purge ratio Rpmax and then limiting the resulting value by the relatively low predetermined duty D1 (setting an upper limit) (step S474), and the purge control valve 65 is controlled using the set driving duty Ddr (step S480).

Then, the pre-valve purge flow rate Qpv is estimated based on the intake air amount Qa and the required purge ratio Rprq (step S490), and this routine is ended. The pre-valve purge flow rate Qpv can be obtained by, for example, applying the intake air amount Qa and the required purge ratio Rprq to a pre-valve purge flow rate estimation map. The pre-valve purge flow rate estimation map is specified in advance by experiment or analysis as a relationship between the intake air amount Qa and the required purge ratio Rprq, and the pre-valve purge flow rate Qpv, and is stored in the ROM or the flash memory (not shown).

Thus, in the embodiment, the target purge ratio Rptg (at least one of the starting purge ratio Rpst1, the resuming purge ratio Rpst2, and the rate values ΔRp1, ΔRp2) and the upper-limit purge ratio Rplim are varied according to which of the downstream purge and the upstream purge is the dominant purge. When the dominant purge is the upstream purge, compared with when the dominant purge is the downstream purge, the fuel injection control tends to make the front air-fuel ratio AF1 unstable due to factors including a longer time taken for the evaporated fuel gas to reach the combustion chamber 30 of the engine 12 and fluctuations of the supercharging pressure Pc, both attributable to the longer path to the combustion chamber 30, as well as the lower reliability of the air-fuel ratio correction amount α [n] for the load factor region Rk [n] than the reliabilities of the air-fuel ratio correction amounts α [1] to α [n−1] for the load factor regions Rk [1] to Rk [n−1]. In the embodiment, the target purge ratio Rptg and the upper-limit purge ratio Rplim are set to be lower when the dominant purge is the upstream purge than when the dominant purge is the downstream purge, which can mitigate the instability of the front air-fuel ratio AF1.

Figure 13:
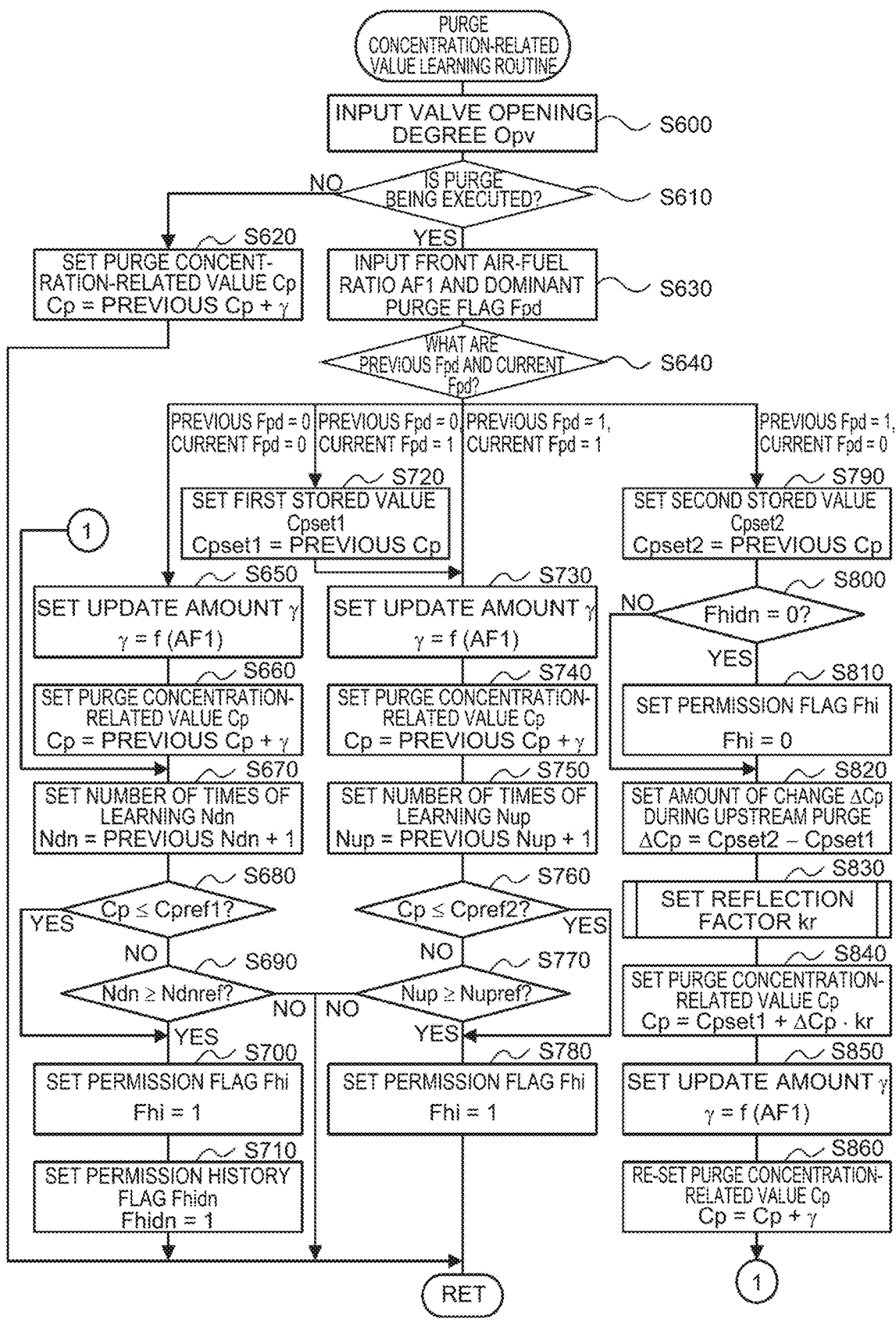
FIG. 13 is a flowchart showing one example of a purge concentration-related value learning routine.

Next, a process of setting (learning) the purge concentration-related value Cp used for setting the purge correction amount β in the fuel injection control routine of FIG. 3 will be described. FIG. 13 is a flowchart showing one example of a purge concentration-related value learning routine. This routine is repeatedly executed by the electronic control unit 70. The value of the purge concentration-related value Cp is set to zero as an initial value when a trip is started.

When the purge concentration-related value learning routine of FIG. 13 is executed, the electronic control unit 70 first inputs the opening degree Opv of the purge control valve 65 (step S600), and determines whether a purge is being executed using the input opening degree Opv of the purge control valve 65 (step S610). As the opening degree Opv of the purge control valve 65, a value detected by the purge control valve position sensor 65a is input. When it is determined in step S610 that a purge is not being executed, a previous value of the purge concentration-related value Cp is retained (step S620), and this routine is ended.

When it is determined in step S610 that a purge is being executed, the front air-fuel ratio AF1 and the dominant purge flag Fpd are input (step S630). As the front air-fuel ratio AF1, a value detected by the front air-fuel ratio sensor 35a is input. As the dominant purge flag Fpd, a value set by the dominant purge determination routine of FIG. 9 is input.

When the pieces of data are thus input, previous and current values of the dominant purge flag (previous Fpd and current Fpd) are checked (step S640). This process is a process of determining which of the following four cases applies: the previous and current dominant purges are the downstream purge; the previous and current dominant purges are the upstream purge; first switching that is switching of the dominant purge from the downstream purge to the upstream purge has just occurred; and second switching that is switching of the dominant purge from the upstream purge to the downstream purge has just occurred. Since the dominant purge determination routine of FIG. 9 is repeatedly executed when the purge condition is met (when a purge is being executed) as described above, these four cases include a case where a purge is interrupted during a period from when the previous value of the dominant purge flag (previous Fpd) is input to when the current value of the dominant purge flag (current Fpd) is input.

When both the previous and current values of the dominant purge flag (previous Fpd and current Fpd) are zero in step S640, i.e., when the previous and current dominant purges are the downstream purge, the update amount γ is set based on the front air-fuel ratio AF1 (step S650), and a value obtained by adding the update amount γ to the previous purge concentration-related value (previous Cp) is set as a new purge concentration-related value Cp (step S660). Thus, the purge concentration-related value Cp is learned (updated) while the dominant purge is the downstream purge. Hereinafter, learning of the purge concentration-related value Cp while the dominant purge is the downstream purge will be referred to as "downstream purge concentration learning."

Figure 14:
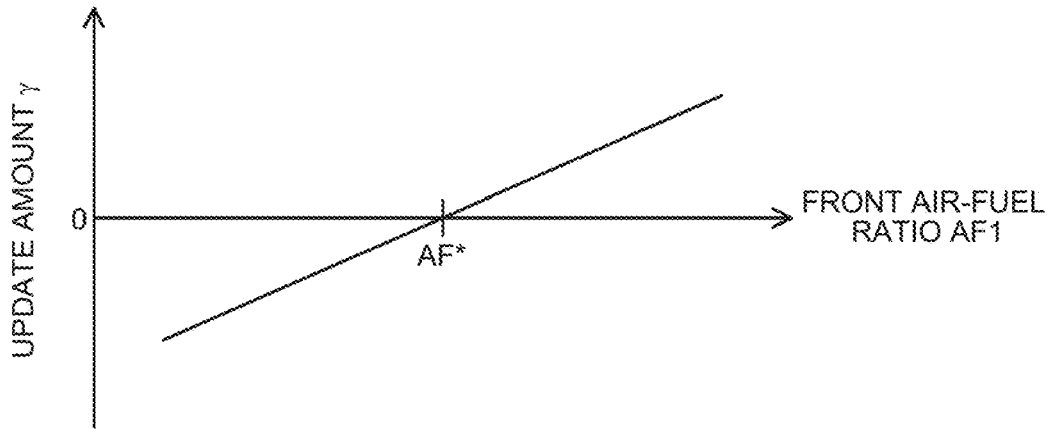
FIG. 14 is a graph illustrating one example of an update amount setting map.

The update amount γ can be obtained by applying the front air-fuel ratio AF1 to an update amount setting map. The update amount setting map is specified in advance by experiment or analysis as a relationship between the front air-fuel ratio AF1 and the update amount γ, and is stored in the ROM or the flash memory (not shown). FIG. 14 is a graph illustrating one example of the update amount setting map. As shown, the update amount γ is set such that, when the front air-fuel ratio AF1 is on the rich side or the lean side relative to the required air-fuel ratio AF*, the absolute value of the update amount γ becomes larger within a negative range or a positive range as the difference between the front air-fuel ratio AF1 and the required air-fuel ratio AF* becomes larger (as the front air-fuel ratio AF1 deviates further from the required air-fuel ratio AF*). When the purge concentration-related value Cp thus set is a negative value, this means that the gas passing through the purge control valve 65 contains evaporated fuel, and when the purge concentration-related value Cp is equal to or larger than zero, this means that the gas passing through the purge control valve 65 does not contain evaporated fuel.

Subsequently, the value of a number of times of learning Ndn of the downstream purge concentration learning is increased by one to update it (step S670). The value of the number of times of learning Ndn of the downstream purge concentration learning is set to zero as an initial value when a trip is started. Then, it is determined whether the purge concentration-related value Cp is equal to or smaller than a negative threshold value Cpref1 (step S680), and it is determined whether the number of times of learning Ndn of the downstream purge concentration learning is equal to or larger than a threshold value Ndnref (step S690). The threshold value Cpref1 and the threshold value Ndnref are threshold values used to determine whether completion conditions for the downstream purge concentration learning are met. As the threshold value Cpref1, for example, about −10%/% to −15%/% is used. As the threshold value Ndnref, for example, about 20 times to 40 times is used.

When it is determined in step S680 that the purge concentration-related value Cp is larger than the threshold value Cpref1 and it is determined in step S690 that the number of times of learning Ndn of the downstream purge concentration learning is smaller than the threshold value Ndnref, it is concluded that completion conditions for the downstream purge concentration learning are not met, and this routine is ended without the permission flag Fhi and a permission history flag Fhidn being changed. The value of the permission flag Fhi is set to zero as an initial value when a trip is started. The value of the permission history flag Fhidn is set to zero as an initial value when a trip is started, and is set to one when the high-duty control is permitted while the dominant purge is the downstream purge (when the completion conditions for the downstream purge concentration learning are met).

When it is determined in step S680 that the purge concentration-related value Cp is equal to or smaller than the threshold value Cpref1 or it is determined in step S690 that the number of times of learning Ndn of the downstream purge concentration learning is equal to or larger than the threshold value Ndnref, it is concluded that the completion conditions for the downstream purge concentration learning are met. The value of the permission flag Fhi is set to one (step S700) and the value of the permission history flag Fhidn is set to one (step S710), and this routine is ended. By this process, the high-duty control can be permitted when the completion conditions for the downstream purge concentration learning are met. When the current value of the dominant purge flag (current Fpd) is zero in step S640, the downstream purge concentration learning is performed by the process in step S650 and S660, regardless of whether the completion conditions for the downstream purge concentration learning are met.

When both the previous and current values of the dominant purge flag (previous Fpd and current Fpd) are one in step S640, i.e., when the previous and current dominant purges are the upstream purge, the update amount γ is set and the purge concentration-related value Cp is set (steps S730 and S740), as in the process in steps S650 and S660. Thus, the purge concentration-related value Cp is learned (updated) also when the dominant purge is the upstream purge, as when the dominant purge is the downstream purge. Hereinafter, learning of the purge concentration-related value Cp while the dominant purge is the upstream purge will be referred to as "upstream purge concentration learning."

Subsequently, a number of times of learning Nup of the upstream purge concentration learning is increased by one to update it (step S750). The value of the number of times of learning Nup of the upstream purge concentration learning is set to zero as an initial value when a trip is started. Then, it is determined whether the purge concentration-related value Cp is equal to or smaller than a negative threshold value Cpref2 (step S760), and it is determined whether the number of times of learning Nup of the upstream purge concentration learning is equal to or larger than a threshold value Nupref (step S770). The threshold value Cpref2 and the threshold value Nupref are threshold values used to determine whether completion conditions for the upstream purge concentration learning are met. As the threshold value Cpref2, for example, the same value as the threshold value Cpref1 is used. As the threshold value Nupref, for example, the same value as the threshold value Ndnref is used.

When it is determined in step S760 that the purge concentration-related value Cp is larger than the threshold value Cpref2 and it is determined in step S770 that the number of times of learning Nup of the upstream purge concentration learning is smaller than the threshold value Nupref, it is concluded that the completion conditions for the upstream purge concentration learning are not met, and this routine is ended without the permission flag Fhi being changed (with the value zero or one thereof retained).

When it is determined in step S760 that the purge concentration-related value Cp is equal to or smaller than the threshold value Cpref2 or it is determined in step S770 that the number of times of learning Nup of the upstream purge concentration learning is equal to or larger than the threshold value Nupref, it is concluded that the completion conditions for the upstream purge concentration learning are met. The value of the permission flag Fhi is set to one (step S780), and this routine is ended. By this process, the high-duty control can be permitted when the completion conditions for the upstream purge concentration learning are met, even when the high-duty control was not permitted while the dominant purge was the downstream purge. Thus, the inconvenience of not being able to permit the high-duty control and increase the purge ratio while the dominant purge is the upstream purge is less likely to arise. When the current value of the dominant purge flag (current Fpd) is one in step S640, the upstream purge concentration learning is performed by the process in step S760 and S770, regardless of whether the completion conditions for the upstream purge concentration learning are met.

When the previous value of the dominant purge flag (previous Fpd) is zero and the current value of the dominant purge flag (current Fpd) is one in step S640, i.e., when the first switching that is switching of the dominant purge from the downstream purge to the upstream purge has just occurred, the previous purge concentration-related value (previous Cp), i.e., the purge concentration-related value Cp immediately before the first switching, is set as a first stored value Cpset1 (step S720), and the process in step S730 and the subsequent steps are executed.

When the previous value of the dominant purge flag (previous Fpd) is one and the current value of the dominant purge flag (current Fpd) is zero in step S640, i.e., when the second switching that is switching of the dominant purge from the upstream purge to the downstream purge has just occurred, the previous purge concentration-related value (previous Cp), i.e., the purge concentration-related value Cp immediately before the second switching, is set as a second stored value Cpset2 (step S790).

Subsequently, the value of the permission history flag Fhidn is checked (step S800). This process is a process of determining, when the first switching that is switching of the dominant purge from the previous downstream purge to the upstream purge occurs and then the second switching that is switching from the upstream purge to the current downstream purge occurs, whether there is a history that the high-duty control was permitted (the completion conditions for the downstream purge concentration learning were met) while the dominant purge was the downstream purge before the second switching.

When the value of the permission history flag Fhidn is one in step S800, it is concluded that there is a history that the high-duty control was permitted while the dominant purge was the downstream purge before the second switching, and the value of the permission flag Fhi is retained. When the values of the permission flag Fhi and the permission history flag Fhidn were set to one while the dominant purge was the previous or earlier downstream purge, the value one of the permission flag Fhi and the permission history flag Fhidn is retained when the dominant purge becomes the upstream purge thereafter. Therefore, when the dominant purge becomes the current downstream purge, the value one of the permission flag Fhi is retained, i.e., permission of the high-duty control is retained.

When the value of the permission history flag Fhidn is zero in step S800, it is concluded that there is no history that the high-duty control was permitted while the dominant purge was the downstream purge before the second switching, and the value of the permission flag Fhi is set to zero (step S810). Cases where the value of the permission history flag Fhidn is zero in step S800 include a case where the value of the permission flag Fhi was switched to one and a case where the value was not switched to one, between the first switching and the second switching (while the dominant purge was the upstream purge). Therefore, when the value of the permission history flag Fhidn is zero in step S800, the value of the permission flag Fhi is switched from one to zero, or the value zero thereof is retained, i.e., permission of the high-duty control is switched to prohibition thereof, or prohibition thereof is retained.

As described above, the fuel injection control tends to make the front air-fuel ratio AF1 unstable when the dominant purge is the upstream purge compared with when the dominant purge is the downstream purge. Thus, the accuracy of the purge concentration-related value Cp (learned value) tends to be lower (a deviation of the learned value from a theoretical value that is theoretically expected tends to be larger) when the dominant purge is the upstream purge than when the dominant purge is the downstream purge. Therefore, when there is no history that the high-duty control was permitted (the completion conditions for the downstream purge concentration learning were met) while the dominant purge was the previous or earlier downstream purge, and moreover the high-duty control was permitted while the dominant purge was the upstream purge, if the high-duty control is continuously permitted after the dominant purge switches to the current downstream purge, the air-fuel ratio of the engine 12 may fluctuate for reasons such as that the downstream purge concentration learning was not performed under the high-duty control. In the embodiment, however, when there is no history that the high-duty control was permitted while the dominant purge was the previous or earlier downstream purge and moreover the high-duty control was permitted while the dominant purge was the upstream purge, permission of the high-duty control is switched to prohibition thereof at the time of switching of the dominant purge to the current downstream purge. This can mitigate fluctuations in the air-fuel ratio of the engine 12 after the dominant purge has switched from the upstream purge to the downstream purge.

Subsequently, a value obtained by subtracting the first stored value Cpset1 (the purge concentration-related value Cp immediately before the first switching) from the second stored value Cpset2 (the purge concentration-related value Cp immediately before the second switching) is set as an amount of change ΔCp during the upstream purge that is an amount of change in the purge concentration-related value Cp while the dominant purge is the upstream purge (step S820). Then, a reflection factor kr that is equal to or smaller than one is set by a reflection factor setting routine to be described later (step S830). As shown in Formula (1), a sum of the first stored value Cpset1 and a value obtained by multiplying the amount of change ΔCp during the upstream purge by the reflection factor kr is set as the purge concentration-related value Cp (step S840). Thus, when the value of the reflection factor kr is smaller than one, the purge concentration-related value Cp is set to a value closer to the first stored value Cpset1 than to the second stored value Cpset2. More specifically, the purge concentration-related value Cp is set to a value closer to the first stored value Cpset1 when the reflection factor kr is smaller. When the value of the reflection factor kr is one, the second stored value Cpset2 is set as the purge concentration-related value Cp.

$$Cp = Cpset1 + \Delta Cp \cdot kr \quad (1)$$

Then, the update amount γ is set as in the process in step S650 described above (step S850). The purge concentration-related value Cp is re-set by adding the update amount γ to the purge concentration-related value (previous Cp) set in step S840 (step S860), and the process in step S670 and the subsequent steps are executed.

Figure 15:
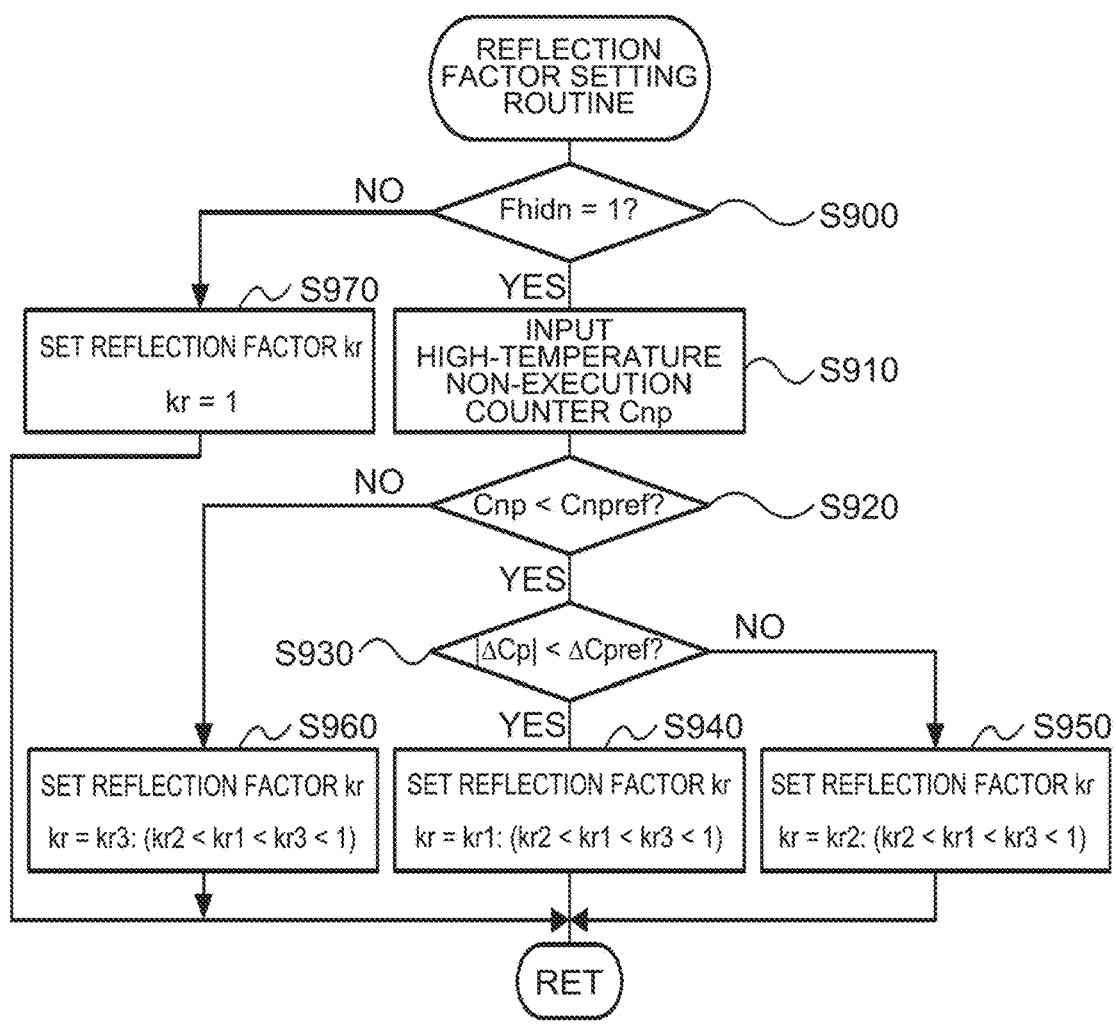
FIG. 15 is a flowchart showing one example of a reflection factor setting routine.

Next, the process in step S830 of the purge concentration-related value learning routine of FIG. 13, i.e., the process of setting the reflection factor kr, will be described using the reflection factor setting routine of FIG. 15. When this routine is executed, the electronic control unit 70 first checks the value of the permission history flag Fhidn (step S900). Like the process in step S800 of the purge concentration-related value learning routine of FIG. 13, this process is a process of, when the first switching occurs and then the second switching occurs, determining whether there is a history that the high-duty control was permitted (the completion conditions for the downstream purge concentration learning were met) while the dominant purge was the downstream purge before the second switching.

Figure 16:
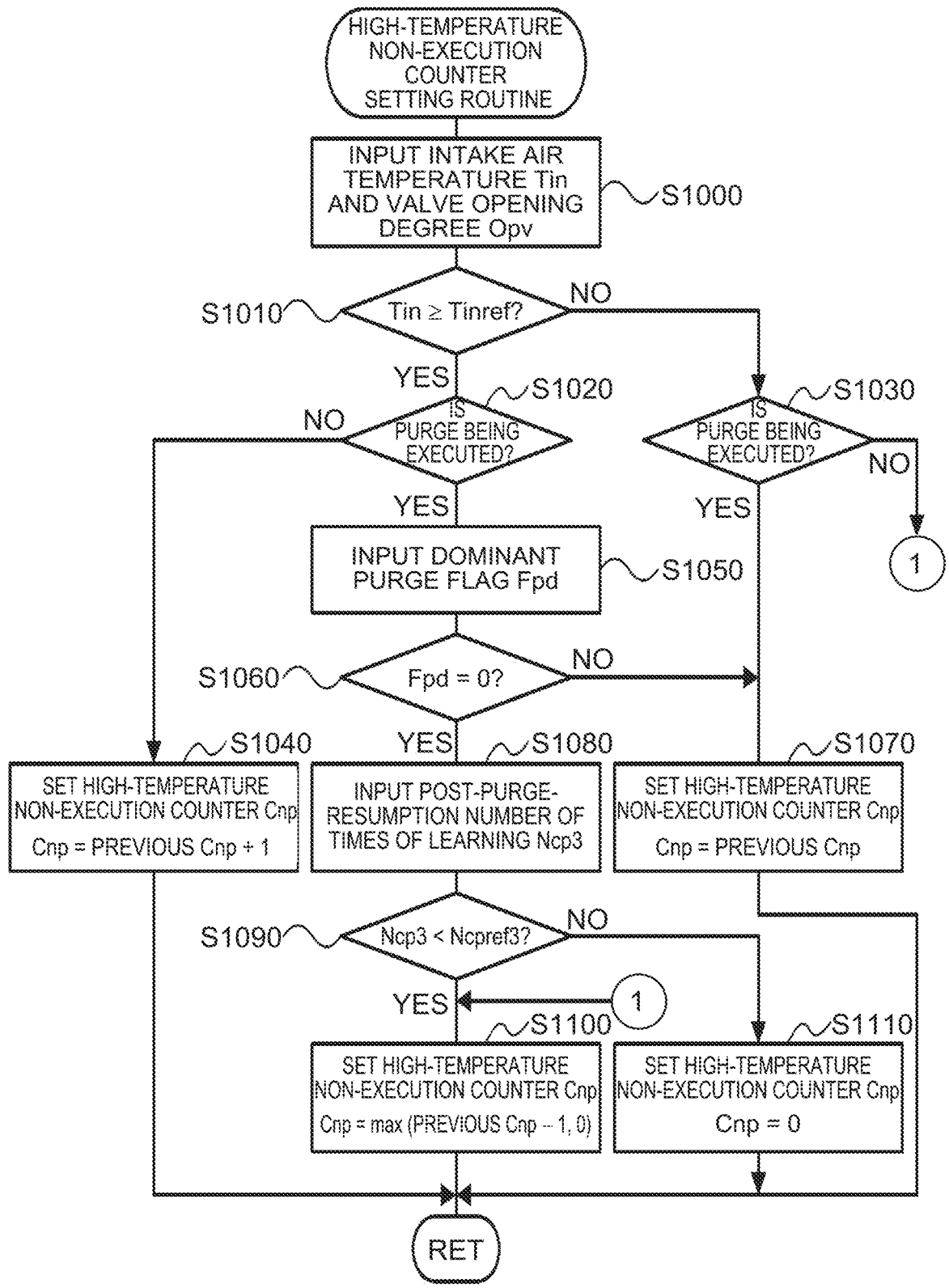
FIG. 16 is a flowchart showing one example of a high-temperature non-execution counter setting routine.

When the value of the permission history flag Fhidn is one in step S900, it is concluded that there is a history that the high-duty control was permitted while the dominant purge was the downstream purge before the second switching, and a high-temperature non-execution counter Cnp is input (step S910). The high-temperature non-execution counter Cnp is a counter related to a time during which a purge is not executed in a high-temperature environment. As the high-temperature non-execution counter Cnp, a value set by the high-temperature non-execution counter setting routine of FIG. 16 is input. The value of the high-temperature non-execution counter Cnp is set to zero as an initial value when a trip is started. Here, the description of the reflection factor setting routine of FIG. 15 will be suspended to describe the high-temperature non-execution counter setting routine of FIG. 16.

The high-temperature non-execution counter setting routine of FIG. 16 is repeatedly executed by the electronic control unit 70. When this routine is executed, the electronic control unit 70 first inputs pieces of data including the intake air temperature Tin of the engine 12 and the opening degree Opv of the purge control valve 65 (step S1000). As the intake air temperature Tin, a value detected by the intake air temperature sensor 23t is input. As the opening degree Opv of the purge control valve 65, a value detected by the purge control valve position sensor 65a is input.

Subsequently, it is determined whether the intake air temperature Tin of the engine 12 is equal to or higher than a threshold value Tinref (step S1010), and it is determined whether a purge is being executed using the opening degree Opv of the purge control valve 65 (step S1020 or step S1030). The threshold value Tinref is a threshold value used to determine whether the intake air temperature Tin of the engine 12 is high. As the threshold value Tinref, for example, about 50° C. to 65° C. is used.

When it is determined in step S1010 that the intake air temperature Tin is equal to or higher than the threshold value Tinref and it is determined in step S1020 that a purge is not being executed, the value of the high-temperature non-execution counter Cnp is increased by one to update it (step S1040), and this routine is ended.

When it is determined in step S1010 that the intake air temperature Tin is lower than the threshold value Tinref and it is determined in step S1030 that a purge is being executed, the previous value of the high-temperature non-execution counter Cnp is retained (step S1070), and this routine is ended.

When it is determined in step S1010 that the intake air temperature Tin is lower than the threshold value Tinref and it is determined in step S1030 that a purge is not being executed, the value of the high-temperature non-execution counter Cnp is decreased by one to update it as a value limited by zero (by setting a lower limit) (step S1100), and this routine is ended.

When it is determined in step S1010 that the intake air temperature Tin is equal to or higher than the threshold value Tinref and it is determined in step S1020 that a purge is being executed, the dominant purge flag Fpd is input (step S1050). As the dominant purge flag Fpd, a value set by the dominant purge determination routine of FIG. 9 is input. Subsequently, the value of the dominant purge flag Fpd is checked (step S1060). When the value of the dominant purge flag Fpd is one, i.e., when the dominant purge is the upstream purge, the previous value of the high-temperature non-execution counter Cnp is retained (step S1070), and this routine is ended.

When the value of the dominant purge flag Fpd is zero in step S1060, i.e., when the dominant purge is the downstream purge, a post-resumption number of times of learning Ncp3 that is a number of times the purge concentration-related value Cp is learned after resumption of a purge when a purge is interrupted and then resumed is input (step S1080), and the post-resumption number of times of learning Ncp3 is compared with a threshold value Ncpref3 (step S1090). The threshold value Ncpref3 is a threshold value used to determine whether learning of the purge concentration-related value Cp has progressed since resumption of a purge. As the threshold value Ncpref3, for example, about three times to ten times is used.

When the post-resumption number of times of learning Ncp3 is smaller than the threshold value Ncpref3 in step S1090, the value of the high-temperature non-execution counter Cnp is decreased by one to update it as a value limited by zero (by setting a lower limit) (step S1100), and this routine is ended. When the post-resumption number of times of learning Ncp3 is equal to or larger than the threshold value Ncpref3 in step S1090, the value of the high-temperature non-execution counter Cnp is reset to zero (step S1110), and this routine is ended.

The high-temperature non-execution counter setting routine of FIG. 16 has been described. The description of the reflection factor setting routine of FIG. 15 will be resumed. When the high-temperature non-execution counter Cnp is input in step S910, the input high-temperature non-execution counter Cnp is compared with a threshold value Cnpref (step S920). The threshold value Cnpref is a threshold value used to determine whether a time during which a purge is not executed in a high-temperature environment is long. As the threshold value Cnpref, for example, 10 s to 20 s is used.

When the high-temperature non-execution counter Cnp is smaller than the threshold value Cnpref in step S920, it is concluded that the time during which a purge is not executed in a high-temperature environment is not long, and the absolute value of the amount of change ΔCp during the upstream purge is compared with a threshold value ΔCpref (step S930). The threshold value ΔCpref is a threshold value used to determine whether the purge concentration-related value Cp changed significantly between the first switching and the second switching (while the dominant purge was the upstream purge). As the threshold value ΔCpref, for example, about 3%/% to 7%/% is used.

When the absolute value of the amount of change ΔCp during the upstream purge is smaller than the threshold value ΔCpref in step S930, it is concluded that the purge concentration-related value Cp did not significantly change between the first switching and the second switching. The value of the reflection factor kr is set to kr1 that is smaller than one (step S940), and this routine is ended. When the absolute value of the amount of change ΔCp during the upstream purge is equal to or larger than the threshold value ΔCpref in step S930, it is concluded that the purge concentration-related value Cp changed significantly between the first switching and the second switching, and the value of the reflection factor kr is set to kr2 that is smaller than kr1 (step S950), and this routine is ended. When the reflection factor kr is thus set, by the process in step S840 of the purge concentration-related value learning routine of FIG. 13, the purge concentration-related value Cp is set to a value closer to the first stored value Cpset1 than to the second stored value Cpset2. More specifically, the purge concentration-related value Cp is set to a value closer to the first stored value Cpset1 as the reflection factor kr is smaller.

The accuracy of the purge concentration-related value Cp (learned value) tends to be lower (the deviation of the learned value from the theoretical value tends to be larger) when the dominant purge is the upstream purge than when the dominant purge is the downstream purge. The present inventors confirmed by experiment and analysis that when the dominant purge was the upstream purge, the purge concentration-related value Cp tended to undergo a great degree of change (as the absolute value) compared with a theoretical degree of change that was theoretically expected, and that the purge concentration-related value Cp tended to undergo a greater degree of change relatively to the theoretical degree of change when the absolute value of the amount of change ΔCp during the upstream purge was larger. In the embodiment, therefore, the reflection factor kr is set to a smaller value and the purge concentration-related value Cp is set to a value closer to the first stored value Cpset1 when, at the time of occurrence of the second switching, the absolute value of the amount of change ΔCp during the upstream purge is equal to or larger than the threshold value ΔCpref than when the absolute value of the amount of change ΔCp during the upstream purge is smaller than the threshold value ΔCpref. Thus, when the second switching occurs, the purge concentration-related value Cp can be promptly corrected to a more appropriate value. As a result, fluctuations in the air-fuel ratio of the engine 12 after the second switching occurs can be mitigated. The reflection factor kr is specified based on a degree to which the degree of change in the purge concentration-related value Cp becomes greater relatively to the theoretical degree of change. For example, when it is found by experiment and analysis that in the case where the absolute value of the amount of change ΔCp during the upstream purge is smaller than the threshold value ΔCpref and in the case where the absolute value is equal to or larger than the threshold value ΔCpref, the purge concentration-related value Cp undergoes degrees of change that are about 10% and about 20%, respectively, greater than the theoretical degree of change, it is preferable that about 0.9 and about 0.8 be used as the reflection factor kr for the former case and the latter case, respectively.

When the value of the high-temperature non-execution counter Cnp is equal to or larger than the threshold value Cnpref in step S920, it is concluded that the time during which a purge is not executed in a high-temperature environment is long, and the value of the reflection factor kr is set to kr3 that is smaller than one and larger than kr1 and kr2 described above (step S960), and this routine is ended.

When the time during which a purge is not executed in a high-temperature environment is long, the influence that the decrease in the accuracy of the purge concentration-related value Cp (learned value) in the upstream purge concentration learning (the deviation of the learned value from the theoretical value) has on the second stored value Cpset2 is expected to be small compared with the influence that the deviation of the purge concentration-related value Cp (learned value) from the theoretical value due to evaporated fuel generated inside the fuel tank 11 (the influence of a purge not being executed) has on the second stored value Cpset2. In the embodiment, therefore, the reflection factor kr is set to a larger value and the purge concentration-related value Cp is set to a value closer to the second stored value Cpset2 when the value of the high-temperature non-execution counter Cnp is equal to or larger than the threshold value Cnpref at the time of occurrence of the second switching than when the value of the high-temperature non-execution counter Cnp is smaller than the threshold value Cnpref. Thus, when the second switching occurs, the purge concentration-related value Cp can be promptly corrected to a more appropriate value.

When the value of the permission history flag Fhidn is zero in step S900, it is concluded that there is no history that the high-duty control was permitted while the dominant purge was the downstream purge before the second switching. The value of the reflection factor kr is set to one (step S970), and this routine is ended.

In the embodiment, as described above, when, at the time of occurrence of the second switching, there is no history that the high-duty control was permitted while the dominant purge was the downstream purge before the second switching, permission of the high-duty control is switched to prohibition thereof, or prohibition thereof is retained. Thus, in this case, the purge concentration-related value Cp is less likely to change significantly immediately after the second switching. In the embodiment, therefore, when, at the time of occurrence of the second switching, there is no history that the high-duty control was permitted while the dominant purge was the downstream purge before the second switching, the purge concentration-related value Cpset is set as the purge concentration-related value Cp. Thus, the purge-concentration-related value Cp can be set to an appropriate value.

Figure 17:
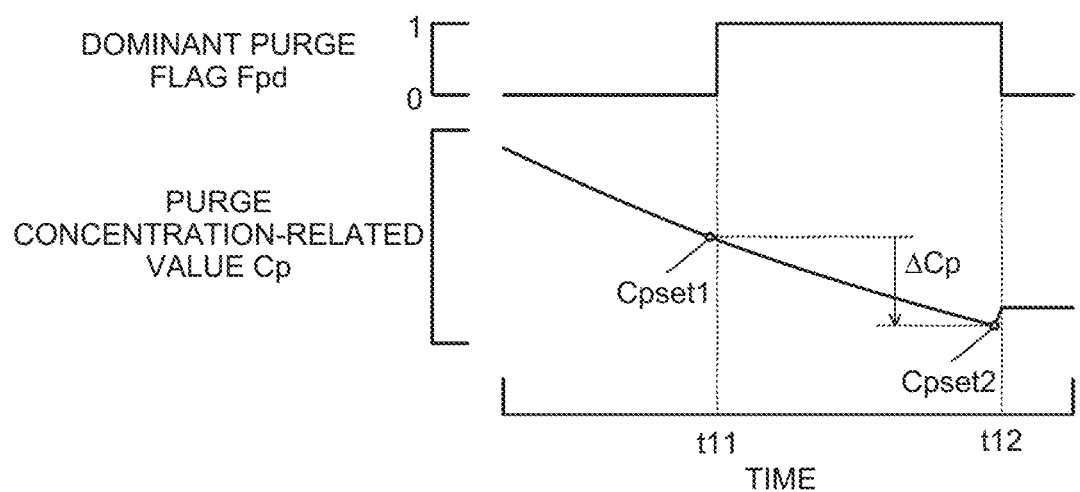
FIG. 17 is a view illustrating one example of the states of a dominant purge flag Fpd and a purge concentration-related value Cp during execution of a purge.

FIG. 17 is a view illustrating one example of the states of the dominant purge flag Fpd and the purge concentration-related value Cp during execution of a purge. FIG. 17 shows the states when the value of the permission history flag Fhidn is one (when the value of the reflection factor kr is set to a value smaller than one) at the time of occurrence of the second switching. As shown, when the first switching occurs (time t11) and then the second switching occurs (time t12), the purge concentration-related value Cp is corrected using the reflection factor kr and the amount of change ΔCp during the upstream purge that is obtained by subtracting the first stored value Cpset1 from the second stored value Cpset2. Thus, the purge concentration-related value Cp can be corrected to a more appropriate value.

In the engine device 10 of the embodiment having been described above, when the first switching that is switching of the dominant purge from the downstream purge to the upstream purge occurs and then the second switching that is switching of the dominant purge from the upstream purge to the downstream purge occurs, the purge concentration-related value Cp is set to a value closer to the first stored value Cpset1 that is the purge concentration-related value Cp immediately before the first switching than to the second stored value Cpset2 that is the purge concentration-related value Cp immediately before the second switching. Thus, when the second switching occurs, the purge concentration-related value Cp can be promptly corrected to a more appropriate value.

In the engine device 10 of the embodiment, in the case where the value of the permission history flag Fhidn is one and the value of the high-temperature non-execution counter Cnp is smaller than the threshold value Cnpref at the time of occurrence of the second switching, when the absolute value of the amount of change ΔCp during the upstream purge is smaller than the threshold value ΔCpref, the value of the reflection factor kr is set to kr1, and when the absolute value of the amount of change ΔCp during the upstream purge is equal to or larger than the threshold value ΔCpref, the value of the reflection factor kr is set to kr2 that is smaller than kr1. However, in the case where the value of the permission history flag Fhidn is one and the value of the high-temperature non-execution counter Cnp is smaller than the threshold value Cnpref at the time of occurrence of the second switching, the reflection factor kr may be set so as to become smaller continuously, or stepwise in multiple stages, as the absolute value of the amount of change ΔCp during the upstream purge becomes larger.

In the engine device 10 of the embodiment, when the second switching occurs, the reflection factor kr is set based on the permission history flag Fhidn, which of the value of the high-temperature non-execution counter Cnp and the threshold value Cnpref is larger, and which of the absolute value of the amount of change ΔCp during the upstream purge and the threshold value ΔCpref is larger, and the purge concentration-related value Cp is corrected based on the first stored value Cpset1, the amount of change ΔCp during the upstream purge, and the reflection factor kr. However, the reflection factor kr may be set within a range smaller than one, without taking the permission history flag Fhidn into account. The reflection factor kr may be set without taking into account which of the value of the high-temperature non-execution counter Cnp and the threshold value Cnpref is larger. Further, the reflection factor kr may be set without taking into account which of the absolute value of the amount of change ΔCp during the upstream purge and the threshold value ΔCpref is larger.

In the engine device 10 of the embodiment, the value of the high-temperature non-execution counter Cnp is increased when the first condition that the intake air temperature Tin is equal to or higher than the threshold value Tinref and moreover a purge is not being executed is met. The value of the high-temperature non-execution counter Cnp is retained when the second condition that the intake air temperature Tin is lower than the threshold value Tinref and moreover a purge is being executed, or the third condition that the intake air temperature Tin is equal to or higher than the threshold value Tinref and moreover the upstream purge is being executed (the value of the dominant purge flag Fpd is one) is met. In the case where none of the first condition, the second condition, and the third condition is met, when the post-resumption number of times of learning Ncp3 is smaller than the threshold value Ncpref3, the value of the high-temperature non-execution counter Cnp is decreased, and when the post-resumption number of times of learning Ncp3 is equal to or larger than the threshold value Ncpref3, the value of the high-temperature non-execution counter Cnp is reset to zero. However, the applicable embodiment is not limited to this example. For example, when the first condition is met, the value of the high-temperature non-execution counter Cnp may be increased, and when the first condition is not met, the value of the high-temperature non-execution counter Cnp may be decreased or reset to zero.

In the engine device 10 of the embodiment, the target purge ratio Rptg (at least one of the starting purge ratio Rpst1, the resuming purge ratio Rpst2, and the rate values ΔRp1, ΔRp2) and the upper-limit purge ratio Rplim are varied according to which of the downstream purge and the upstream purge is the dominant purge. However, only either the target purge ratio Rptg or the upper-limit purge ratio Rplim may be varied according to which of the downstream purge and the upstream purge is the dominant purge, or other parameters related to control of the purge control valve 65 than the target purge ratio Rptg and the upper-limit purge ratio Rplim may be varied.

In the engine device 10 of the embodiment, the offset amount kd is set based on the surge pressure Ps, and which of the downstream purge and the upstream purge is the dominant purge is determined based on the ejector pressure Pej and the value obtained by subtracting the offset amount kd from the surge pressure Ps. However, which of the downstream purge and the upstream purge is the dominant purge may be determined based on the ejector pressure Pej and a value obtained by subtracting a fixed offset amount kd, irrelevant of the surge pressure Ps, from the surge pressure Ps. Also in this case, which of the downstream purge and the upstream purge is the dominant purge can be appropriately determined, albeit with less accuracy than in the embodiment, compared with when the influence based on the cross-sectional area of the second purge passage relative to the cross-sectional area of the first purge passage 62 is not taken into account.

In the engine device 10 of the embodiment, the air-fuel ratio correction amounts α [1] to α [n] are set only once in each trip for the respective load factor regions Rk [1] to Rk [n]. However, the air-fuel ratio correction amounts α [1] to α [n] may be set multiple times during one trip. In this case, the process of step S250 in the air-fuel ratio correction amount setting routine of FIG. 5 need not be executed.

In the engine device 10 of the embodiment, the range expected of the load factor KL is divided into the load factor regions Rk [1] to Rk [n], and the air-fuel ratio correction amounts α [1] to α [n] for the respective load factor regions Rk [1] to Rk [n] are set. Instead of this, a range expected of the intake air amount Qa may be divided into a plurality of air amount regions Rq [1] to Rq [n], and air-fuel ratio correction amounts α [1] to α [n] for the respective air amount regions Rq [1] to Rq [n] may be set.

In the engine device 10 of the embodiment, which of the downstream purge and the upstream purge is the dominant purge is determined based on the ejector pressure Pej and the value obtained by subtracting the offset amount kd from the surge pressure Ps. However, which of the downstream purge and the upstream purge is the dominant purge may be determined based on the load factor KL and the intake air amount Qa. In this case, which of the downstream purge and the upstream purge is the dominant purge may be determined based on the load factor KL and a value at a border between the load factor region Rk [n−1] and the load factor region Rk [n], or which of the downstream purge and the upstream purge is the dominant purge may be determined based on the intake air amount Qa and a value at a border between the air amount region Rq [n−1] and the air amount region Rq [n].

In the engine device 10 of the embodiment, the engine 12 includes the cylinder injection valve 28 that injects fuel into the combustion chamber 30. However, in addition to or in place of the cylinder injection valve 28, the engine 12 may include a port injection valve that injects fuel into the suction port.

In the engine device 10 of the embodiment, the turbocharger 40 is configured as a turbocharger in which the compressor 41 disposed in the intake pipe 23 and the turbine 42 disposed in the exhaust pipe 35 are coupled to each other through the rotating shaft 43. Instead of this, the turbocharger 40 may be configured as a supercharger in which a compressor driven by the engine 12 or a motor is disposed in the intake pipe 23.

In the engine device 10 of the embodiment, the common passage 61 of the evaporated fuel processing device 50 is connected to the introduction passage 52, near the canister 56. However, the common passage 61 may be connected to the canister 56.

In the embodiment, the present disclosure is implemented in the form of the engine device 10 that is installed in ordinary cars or various hybrid cars. However, the present disclosure may be implemented in the form of an engine device that is installed in a vehicle other than a car, or in the form of an engine device that is installed in stationary equipment, such as construction equipment.

Since the embodiment is an example for specifically describing the mode for carrying out the disclosure described in the section SUMMARY, correspondence relationships between the major elements of the embodiment and the major elements of the disclosure described in that section do not limit the elements of the disclosure described in that section. Thus, the disclosure described in the section SUMMARY should be interpreted based on the description in that section, and the embodiment is merely a specific example of the disclosure described in that section.

While the mode for carrying out the present disclosure has been described above using the embodiment, it should be understood that the present disclosure is in no way limited to such an embodiment but can be implemented in various forms within the scope of the gist of the disclosure.

The present disclosure is applicable to the engine device manufacturing industry and the like.

What is claimed is:

1. An engine device comprising:
an engine that has a throttle valve disposed in an intake pipe and a fuel injection valve and outputs power using fuel supplied from a fuel tank;
a turbocharger having a compressor disposed in the intake pipe, upstream of the throttle valve;
an evaporated fuel processing device having
a supply passage that splits into a first purge passage and a second purge passage that are connected to the intake pipe, downstream of the throttle valve, and supplies evaporated fuel gas containing evaporated fuel generated inside the fuel tank to the intake pipe,
an ejector having an intake port connected to a recirculation passage extending from the intake pipe, between the compressor and the throttle valve, an exhaust port connected to the intake pipe, upstream of the compressor, and a suction port connected to the second purge passage, and a purge control valve provided in the supply passage;

an air-fuel ratio sensor mounted on an exhaust pipe of the engine; and a controller that controls the fuel injection valve by setting a required injection amount using a required load factor of the engine and a purge correction amount that is based on a purge concentration-related value related to a concentration of the evaporated fuel gas, controls the purge control valve using a driving duty based on a required purge ratio while a purge of supplying the evaporated fuel gas to the intake pipe is executed, and learns, during execution of the purge, the purge concentration-related value based on an air-fuel ratio deviation that is a deviation of an air-fuel ratio detected by the air-fuel ratio sensor from a required air-fuel ratio, wherein when first switching that is switching from a first purge of supplying the evaporated fuel gas to the intake pipe through the first purge passage to a second purge of supplying the evaporated fuel gas to the intake pipe through the second purge passage occurs and then second switching that is switching from the second purge to the first purge occurs, the controller corrects the purge concentration-related value to a value closer to a first stored value that is the purge concentration-related value immediately before the first switching than to a second stored value that is the purge concentration-related value immediately before the second switching.

2. The engine device according to claim 1, wherein the controller corrects the purge concentration-related value to a value closer to the first stored value when a difference between the second stored value and the first stored value at a time of occurrence of the second switching is large than when the difference is small.

3. The engine device according to claim 1, wherein the controller corrects the purge concentration-related value within a range closer to the second stored value when, at a time of occurrence of the second switching, a counter related to a time during which an intake air temperature of the engine is equal to or higher than a predetermined temperature and the purge is not executed has a large value than when the counter has a small value.

4. The engine device according to claim 3, wherein:

when a first condition that the intake air temperature is equal to or higher than the predetermined temperature and moreover the purge is not being executed is met, the controller increases the value of the counter;

when a second condition that the intake air temperature is lower than the predetermined temperature and moreover the purge is being executed, or a third condition that the intake air temperature is equal to or higher than the predetermined temperature and moreover, of the purges, the second purge is being executed is met, the controller retains the value of the counter; and when none of the first condition, the second condition, and the third condition is met, the controller decreases or resets the value of the counter.

5. The engine device according to claim 1, wherein, when the second switching occurs, the controller corrects the purge concentration-related value as a sum of the first stored value and a value that is obtained by subtracting the first stored value from the second stored value and then multiplying the resulting value by a factor that is smaller than one.

6. The engine device according to claim 1, wherein, when, at a time of occurrence of the second switching, there is no permission history that high-duty control of making the driving duty higher than a predetermined duty was permitted during the first purge before the second switching, the controller prohibits the high-duty control and sets the second stored value as the purge concentration-related value.

7. The engine device according to claim 1, wherein the controller sets the required injection amount using the required load factor, an air-fuel ratio correction amount related to a deviation of the air-fuel ratio sensor, and the purge correction amount, and when a predetermined condition is met, further sets the air-fuel ratio correction amount for an applicable region to which a current intake air amount or load factor of the engine belongs among a plurality of regions into which a range of the intake air amount or the load factor is divided such that a region of a larger intake air amount or a higher load factor has a larger width than a region of a smaller intake air amount or a lower load factor.

8. The engine device according to claim 1, wherein the controller determines a dominant purge that is dominant one of the first purge and the second purge, based on an ejector pressure that is a pressure at the suction port of the ejector and on a value of a post-throttle-valve pressure that is a pressure inside the intake pipe, downstream of the throttle valve, with an offset amount based on a cross-sectional area of the second purge passage relative to a cross-sectional area of the first purge passage taken into account.

* * * * *